(12) United States Patent
Terra et al.

(10) Patent No.: US 11,010,765 B2
(45) Date of Patent: May 18, 2021

(54) PRELIMINARY ACQUISITION OF PAYMENT INFORMATION

(71) Applicant: Square, Inc., San Francisco, CA (US)

(72) Inventors: David Terra, San Francisco, CA (US); Koun Han, San Francisco, CA (US); Michael Wells White, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 547 days.

(21) Appl. No.: 15/197,707

(22) Filed: Jun. 29, 2016

(65) Prior Publication Data

US 2018/0005237 A1 Jan. 4, 2018

(51) Int. Cl.

| | |
|---|---|
| *G06Q 20/10* | (2012.01) |
| *G06Q 20/20* | (2012.01) |
| *G06Q 20/34* | (2012.01) |
| *G06Q 20/40* | (2012.01) |
| *G06K 7/00* | (2006.01) |

(52) U.S. Cl.
CPC ......... *G06Q 20/409* (2013.01); *G06K 7/0004* (2013.01); *G06Q 20/102* (2013.01); *G06Q 20/20* (2013.01); *G06Q 20/341* (2013.01); *G06Q 2220/00* (2013.01)

(58) Field of Classification Search
CPC .... G06Q 20/409; G06Q 20/20; G06Q 20/341; G06K 7/0004
USPC .......................................................... 705/64
See application file for complete search history.

(56) References Cited

U.S. PATENT DOCUMENTS

| | | | |
|---|---|---|---|
| 3,128,349 | A | 4/1964 | Boesch et al. |
| 4,776,003 | A | 10/1988 | Harris |
| 4,860,336 | A | 8/1989 | DAvello et al. |
| 5,221,838 | A | 6/1993 | Gutman et al. |
| 5,351,296 | A | 9/1994 | Sullivan |
| 5,388,155 | A | 2/1995 | Smith |
| 5,408,513 | A | 4/1995 | Busch, Jr. et al. |
| 5,696,955 | A | 12/1997 | Goddard et al. |

(Continued)

FOREIGN PATENT DOCUMENTS

| | | |
|---|---|---|
| AU | 2324402 A | 6/2002 |
| CA | 2 997 776 A1 | 3/2017 |

(Continued)

OTHER PUBLICATIONS

"Implementation Full EMV Smartcard POS Transaction and Impact on PCI DSS.pdf"; Oludele Ogundele, Pavol Zavarsky, Ron Ruhl, Dale Lindskog; 2012 ASE/IEEE International Conference on Social Computing and 2012 ASE/IEEE International Conference on Privacy, Security, Risk and Trust. (Year: 2012).*

(Continued)

*Primary Examiner* — Patrick McAtee
*Assistant Examiner* — Edgar R Martinez-Hernandez
(74) *Attorney, Agent, or Firm* — Maynard Cooper & Gale, P.C.; Brian T. Sattizahn, Esq.

(57) ABSTRACT

A payment terminal may run a point-of-sale application that is operated by a user such as a merchant. At a certain point in the transaction, but prior to the completion of the transaction, pre-charge requests may be sent to a chip card. The responses from the chip card may be stored such that the transaction may be completed immediately after the merchant and customer complete the transaction steps.

29 Claims, 8 Drawing Sheets

(56) References Cited

U.S. PATENT DOCUMENTS

| | | |
|---|---|---|
| 5,714,741 A | 2/1998 | Pieterse et al. |
| 5,729,591 A | 3/1998 | Bailey |
| 5,740,232 A | 4/1998 | Pailles et al. |
| 5,793,027 A | 8/1998 | Baik |
| 5,838,773 A | 11/1998 | Eisner et al. |
| 5,850,599 A | 12/1998 | Seiderman |
| 5,867,795 A | 2/1999 | Novis et al. |
| 5,940,510 A | 8/1999 | Curry et al. |
| 5,974,312 A | 10/1999 | Hayes, Jr. et al. |
| 6,010,067 A | 1/2000 | Elbaum |
| 6,065,679 A | 5/2000 | Levie et al. |
| 6,098,881 A | 8/2000 | Deland, Jr. et al. |
| 6,144,336 A | 11/2000 | Preston et al. |
| 6,230,319 B1 | 5/2001 | Britt, Jr. et al. |
| 6,234,389 B1 | 5/2001 | Valliani et al. |
| 6,278,779 B1 | 8/2001 | Bryant et al. |
| 6,282,522 B1* | 8/2001 | Davis .................. G06Q 20/02 235/375 |
| 6,332,172 B1 | 12/2001 | Iverson |
| 6,481,623 B1 | 11/2002 | Grant et al. |
| 6,609,655 B1 | 8/2003 | Harrell |
| 6,675,203 B1* | 1/2004 | Herrod ............... G06Q 10/087 709/217 |
| 6,886,742 B2 | 5/2005 | Stoutenburg et al. |
| 6,990,683 B2 | 1/2006 | Itabashi |
| 7,003,316 B1 | 2/2006 | Elias et al. |
| 7,066,382 B2 | 6/2006 | Kaplan |
| 7,083,090 B2 | 8/2006 | Zuili |
| 7,163,148 B2 | 1/2007 | Durbin et al. |
| 7,210,627 B2 | 5/2007 | Morley et al. |
| 7,318,151 B1 | 1/2008 | Harris |
| 7,363,054 B2 | 4/2008 | Elias et al. |
| 7,403,907 B1* | 7/2008 | Gerken, III ............ A47F 9/047 705/14.25 |
| 7,424,732 B2 | 9/2008 | Matsumoto et al. |
| 7,433,452 B2 | 10/2008 | Taylor et al. |
| 7,472,394 B1 | 12/2008 | Meckenstock et al. |
| 7,478,065 B1 | 1/2009 | Ritter et al. |
| 7,591,425 B1 | 9/2009 | Zuili et al. |
| 7,673,799 B2 | 3/2010 | Hart et al. |
| 7,810,729 B2 | 10/2010 | Morley, Jr. |
| 7,896,248 B2 | 3/2011 | Morley, Jr. |
| 8,086,531 B2 | 12/2011 | Litster et al. |
| 8,126,734 B2 | 2/2012 | Dicks et al. |
| 8,180,971 B2 | 5/2012 | Scott et al. |
| 8,196,131 B1 | 6/2012 | von Behren et al. |
| 8,245,076 B2 | 8/2012 | Schindel, Jr. et al. |
| 8,265,553 B2 | 9/2012 | Cheon et al. |
| 8,284,061 B1 | 10/2012 | Dione |
| 8,335,921 B2 | 12/2012 | von Behren et al. |
| 8,336,762 B1 | 12/2012 | DiMattina et al. |
| 8,397,988 B1 | 3/2013 | Zuili |
| 8,534,555 B1 | 9/2013 | Sweet et al. |
| 8,650,439 B2 | 2/2014 | Rabeler |
| 8,910,868 B1 | 12/2014 | Wade et al. |
| 8,959,034 B2 | 2/2015 | Jiang et al. |
| 9,020,853 B2 | 4/2015 | Hoffman et al. |
| 9,092,766 B1 | 7/2015 | Bedier et al. |
| 9,134,994 B2 | 9/2015 | Patel et al. |
| 9,224,142 B2 | 12/2015 | Lamba et al. |
| 9,230,254 B1 | 1/2016 | Sharifi |
| 9,286,494 B1 | 3/2016 | Lamfalusi et al. |
| 9,330,383 B1* | 5/2016 | Vadera ................. G06Q 20/352 |
| 9,342,823 B2 | 5/2016 | Casares et al. |
| 9,357,332 B2 | 5/2016 | Tang et al. |
| 9,547,861 B2 | 1/2017 | Itwaru |
| 9,613,350 B1 | 4/2017 | Vadera |
| 9,672,508 B2 | 6/2017 | Aabye et al. |
| 9,679,286 B2 | 6/2017 | Colnot et al. |
| 9,778,928 B1 | 10/2017 | Steshenko et al. |
| 9,785,930 B1* | 10/2017 | Terra ................... G06Q 20/204 |
| 9,836,732 B1* | 12/2017 | Mocko ................. G06Q 20/204 |
| 9,881,302 B1* | 1/2018 | White .................. G06Q 20/20 |
| 9,916,567 B1 | 3/2018 | Baar et al. |
| 10,062,082 B2 | 8/2018 | Unser et al. |
| 10,163,107 B1* | 12/2018 | White .................. G06Q 20/409 |
| 10,248,940 B1 | 4/2019 | Bota et al. |
| 10,684,848 B1 | 6/2020 | Steshenko et al. |
| 2002/0091633 A1 | 7/2002 | Proctor |
| 2002/0153414 A1 | 10/2002 | Stoutenburg et al. |
| 2003/0132293 A1 | 7/2003 | Fitch et al. |
| 2003/0135418 A1 | 7/2003 | Shekhar et al. |
| 2003/0142855 A1 | 7/2003 | Kuo et al. |
| 2003/0154414 A1 | 8/2003 | von Mueller et al. |
| 2003/0183691 A1 | 10/2003 | Lahteenmaki et al. |
| 2004/0012875 A1 | 1/2004 | Wood |
| 2004/0041911 A1 | 3/2004 | Odagiri et al. |
| 2004/0049451 A1 | 3/2004 | Berardi et al. |
| 2004/0059682 A1 | 3/2004 | Hasumi et al. |
| 2004/0068656 A1 | 4/2004 | Lu |
| 2004/0104268 A1 | 6/2004 | Bailey |
| 2004/0138868 A1 | 7/2004 | Kuznetsov et al. |
| 2004/0167820 A1 | 8/2004 | Melick et al. |
| 2004/0204082 A1 | 10/2004 | Abeyta |
| 2004/0205745 A1 | 10/2004 | Piazza |
| 2004/0230488 A1 | 11/2004 | Beenau et al. |
| 2004/0236672 A1* | 11/2004 | Jung ................... G06Q 20/367 705/38 |
| 2005/0091589 A1 | 4/2005 | Ramarao |
| 2005/0097015 A1 | 5/2005 | Wilkes et al. |
| 2005/0109841 A1 | 5/2005 | Ryan et al. |
| 2005/0136949 A1 | 6/2005 | Barnes, Jr. |
| 2005/0156026 A1 | 7/2005 | Ghosh et al. |
| 2005/0236480 A1 | 10/2005 | Vrotsos et al. |
| 2005/0240919 A1 | 10/2005 | Kim et al. |
| 2006/0032905 A1 | 2/2006 | Bear et al. |
| 2006/0049255 A1 | 3/2006 | von Mueller et al. |
| 2006/0059530 A1 | 3/2006 | Spielman et al. |
| 2006/0093149 A1 | 5/2006 | Zhu et al. |
| 2006/0219776 A1 | 10/2006 | Finn |
| 2006/0223580 A1 | 10/2006 | Antonio et al. |
| 2006/0255128 A1 | 11/2006 | Johnson et al. |
| 2006/0282382 A1 | 12/2006 | Balasubramanian et al. |
| 2007/0044099 A1* | 2/2007 | Rajput ................. G06F 9/5027 718/102 |
| 2007/0067833 A1 | 3/2007 | Colnot |
| 2007/0078957 A1 | 4/2007 | Ypyä et al. |
| 2007/0168265 A1 | 7/2007 | Rosenberger |
| 2007/0168300 A1 | 7/2007 | Quesselaire et al. |
| 2007/0194104 A1 | 8/2007 | Fukuda et al. |
| 2007/0198436 A1 | 8/2007 | Weiss |
| 2007/0241185 A1 | 10/2007 | Pang et al. |
| 2007/0257109 A1 | 11/2007 | Johansen, Jr. et al. |
| 2008/0091617 A1 | 4/2008 | Hazel et al. |
| 2008/0121687 A1 | 5/2008 | Buhot |
| 2008/0162312 A1 | 7/2008 | Sklovsky et al. |
| 2008/0162361 A1 | 7/2008 | Sklovsky et al. |
| 2008/0179388 A1 | 7/2008 | Pang et al. |
| 2008/0203170 A1 | 8/2008 | Hammad et al. |
| 2008/0222193 A1 | 9/2008 | Reid |
| 2008/0245851 A1 | 10/2008 | Kowalski |
| 2009/0037284 A1 | 2/2009 | Lewis et al. |
| 2009/0048953 A1* | 2/2009 | Hazel ................... G06Q 20/04 705/35 |
| 2009/0070583 A1 | 3/2009 | von Mueller et al. |
| 2009/0083474 A1 | 3/2009 | Cooke |
| 2009/0099961 A1 | 4/2009 | Ogilvy |
| 2009/0112768 A1 | 4/2009 | Hammad et al. |
| 2009/0164326 A1 | 6/2009 | Bishop et al. |
| 2009/0217257 A1 | 8/2009 | Huang et al. |
| 2009/0279549 A1 | 11/2009 | Ramanathan et al. |
| 2010/0023777 A1 | 1/2010 | Prevost et al. |
| 2010/0057620 A1 | 3/2010 | Li et al. |
| 2010/0063893 A1 | 3/2010 | Townsend |
| 2010/0136913 A1 | 6/2010 | Picquenot et al. |
| 2010/0159907 A1 | 6/2010 | Farley et al. |
| 2010/0233996 A1 | 9/2010 | Herz et al. |
| 2010/0243732 A1 | 9/2010 | Wallner |
| 2010/0257067 A1 | 10/2010 | Chan |
| 2010/0274712 A1 | 10/2010 | Mestre et al. |
| 2010/0287083 A1 | 11/2010 | Blythe |
| 2010/0306076 A1 | 12/2010 | Taveau et al. |
| 2010/0312692 A1 | 12/2010 | Teicher |
| 2011/0078081 A1 | 3/2011 | Pirzadeh et al. |

(56) References Cited

U.S. PATENT DOCUMENTS

| | | |
|---|---|---|
| 2011/0110234 A1* | 5/2011 | Pulijala ............ G06Q 30/0267 370/235 |
| 2011/0119680 A1* | 5/2011 | Li ..................... G06F 9/5038 718/106 |
| 2011/0155800 A1 | 6/2011 | Mastrangelo et al. |
| 2011/0173691 A1 | 7/2011 | Baba |
| 2011/0202415 A1 | 8/2011 | Casares et al. |
| 2012/0011062 A1 | 1/2012 | Baker et al. |
| 2012/0116887 A1 | 5/2012 | Norair |
| 2012/0117568 A1 | 5/2012 | Plotkin |
| 2012/0126012 A1 | 5/2012 | Lamba et al. |
| 2012/0130903 A1 | 5/2012 | Dorsey et al. |
| 2012/0132712 A1 | 5/2012 | Babu et al. |
| 2012/0135681 A1 | 5/2012 | Adams et al. |
| 2012/0143703 A1 | 6/2012 | Wall et al. |
| 2012/0166491 A1 | 6/2012 | Angus et al. |
| 2012/0193434 A1 | 8/2012 | Grigg et al. |
| 2012/0196531 A1 | 8/2012 | Posch et al. |
| 2012/0198434 A1 | 8/2012 | Dirstine et al. |
| 2012/0221466 A1 | 8/2012 | Look |
| 2012/0278795 A1 | 11/2012 | Bouchier et al. |
| 2013/0006847 A1 | 1/2013 | Hammad et al. |
| 2013/0040566 A1 | 2/2013 | Mourtel et al. |
| 2013/0125107 A1 | 5/2013 | Bandakka et al. |
| 2013/0198071 A1* | 8/2013 | Jurss ................ G06Q 20/3223 705/42 |
| 2013/0204721 A1 | 8/2013 | Gazdzinski |
| 2013/0211929 A1 | 8/2013 | Itwaru |
| 2013/0229981 A1 | 9/2013 | Park et al. |
| 2013/0254110 A1 | 9/2013 | Royyuru et al. |
| 2013/0268443 A1 | 10/2013 | Petrov et al. |
| 2013/0283256 A1 | 10/2013 | Proud |
| 2013/0290234 A1 | 10/2013 | Hanis et al. |
| 2013/0290945 A1 | 10/2013 | Sawal et al. |
| 2013/0335199 A1 | 12/2013 | Jonely |
| 2013/0346302 A1 | 12/2013 | Purves et al. |
| 2014/0001263 A1 | 1/2014 | Babu et al. |
| 2014/0081849 A1 | 3/2014 | Varvarezis |
| 2014/0108263 A1 | 4/2014 | Ortiz et al. |
| 2014/0108704 A1 | 4/2014 | Boring |
| 2014/0109076 A1 | 4/2014 | Boone et al. |
| 2014/0136350 A1 | 5/2014 | Savolainen |
| 2014/0138435 A1 | 5/2014 | Khalid |
| 2014/0138436 A1 | 5/2014 | Mestre |
| 2014/0225713 A1 | 8/2014 | McIntyre et al. |
| 2014/0256254 A1 | 9/2014 | Sarda et al. |
| 2014/0263625 A1 | 9/2014 | Smets et al. |
| 2014/0289107 A1 | 9/2014 | Moshal |
| 2014/0297530 A1 | 10/2014 | Eckel et al. |
| 2014/0304094 A1 | 10/2014 | Reddy et al. |
| 2014/0317611 A1 | 10/2014 | Wojcik et al. |
| 2014/0365776 A1* | 12/2014 | Smets ................ H04L 9/0841 713/171 |
| 2015/0039455 A1 | 2/2015 | Luciani |
| 2015/0046323 A1 | 2/2015 | Blythe |
| 2015/0058145 A1* | 2/2015 | Luciani ............ G06Q 20/3274 705/17 |
| 2015/0149353 A1 | 5/2015 | Linden et al. |
| 2015/0161594 A1 | 6/2015 | Jarman et al. |
| 2015/0178730 A1 | 6/2015 | Gleeson et al. |
| 2015/0278562 A1 | 10/2015 | Adrangi et al. |
| 2015/0287031 A1 | 10/2015 | Radu et al. |
| 2015/0294299 A1 | 10/2015 | Maddocks et al. |
| 2015/0348009 A1 | 12/2015 | Brown et al. |
| 2015/0381203 A1 | 12/2015 | Master et al. |
| 2016/0007292 A1 | 1/2016 | Weng et al. |
| 2016/0117659 A1* | 4/2016 | Bedier ................ G06Q 20/204 705/16 |
| 2016/0171482 A1 | 6/2016 | Muncey et al. |
| 2016/0183032 A1* | 6/2016 | Pogorelik ............ H04W 12/04 455/41.1 |
| 2016/0188896 A1 | 6/2016 | Zatko et al. |
| 2016/0188909 A1 | 6/2016 | Zatko et al. |
| 2016/0217465 A1 | 7/2016 | Gaur et al. |
| 2016/0226519 A1 | 8/2016 | Meng et al. |
| 2016/0275478 A1 | 9/2016 | Li et al. |
| 2016/0358159 A1 | 12/2016 | Khan et al. |
| 2017/0083879 A1 | 3/2017 | Vadera |
| 2017/0169670 A1* | 6/2017 | Murphy ................ G06Q 40/12 |
| 2017/0200177 A1 | 7/2017 | Psillas |
| 2017/0236125 A1 | 8/2017 | Guise et al. |
| 2017/0286093 A1 | 10/2017 | Steshenko et al. |
| 2017/0308882 A1 | 10/2017 | Bedier et al. |
| 2017/0364878 A1 | 12/2017 | Malhotra et al. |
| 2018/0005223 A1* | 1/2018 | Terra .................... G06Q 20/352 |
| 2018/0005226 A1* | 1/2018 | Terra .................... G06Q 20/341 |
| 2018/0005237 A1 | 1/2018 | Terra et al. |
| 2018/0096405 A1 | 4/2018 | Cho et al. |
| 2018/0150815 A1* | 5/2018 | Mocko .................. G06Q 20/20 |
| 2018/0268390 A1 | 9/2018 | Nuzum et al. |
| 2018/0276602 A1 | 9/2018 | Rivalto et al. |
| 2019/0114607 A1 | 4/2019 | Wadhwa et al. |
| 2020/0201985 A1 | 6/2020 | Cat et al. |
| 2020/0202327 A1 | 6/2020 | Cat et al. |
| 2020/0202347 A1 | 6/2020 | Cat et al. |
| 2020/0410477 A1 | 12/2020 | Terra et al. |

FOREIGN PATENT DOCUMENTS

| | | |
|---|---|---|
| CN | 108140182 A | 6/2018 |
| CN | 109690593 A | 4/2019 |
| DE | 20320080 U1 | 4/2004 |
| EP | 0 895 203 A2 | 2/1999 |
| EP | 8 95 203 A2 | 2/1999 |
| EP | 1 408 459 A1 | 4/2004 |
| EP | 1408459 A1 | 4/2004 |
| EP | 1 874 014 A2 | 1/2008 |
| FR | 2 812 744 A1 | 2/2002 |
| FR | 2 812 745 A1 | 2/2002 |
| FR | 2812744 A1 | 2/2002 |
| FR | 2812745 A1 | 2/2002 |
| FR | 2 834 156 A1 | 6/2003 |
| FR | 2834156 A1 | 6/2003 |
| GB | 2468774 A | 9/2010 |
| GB | 2519798 A | 5/2015 |
| JP | H0-9231285 A | 9/1997 |
| JP | H09231285 A | 9/1997 |
| JP | H11-110221 A | 4/1999 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-510412 | 4/2002 |
| JP | 2002-510412 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 2004-258870 A | 9/2004 |
| JP | 2004-536405 A | 12/2004 |
| JP | 2006-018408 A | 1/2006 |
| JP | 2009-507308 A | 2/2009 |
| JP | 4248820 B2 | 4/2009 |
| JP | 2010-244248 | 10/2010 |
| JP | 2015-510168 A | 4/2015 |
| JP | 6505948 B2 | 4/2019 |
| JP | 2018-549254 A | 5/2020 |
| JP | 2018-566533 A | 6/2020 |
| JP | 6731080 B2 | 7/2020 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |

(56) References Cited

FOREIGN PATENT DOCUMENTS

| | | |
|---|---|---|
| KR | 2003-0086818 A | 11/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 10-2007-0107990 A | 11/2007 |
| KR | 100842484 B1 | 6/2008 |
| RU | 2284578 C1 | 9/2006 |
| WO | 1998/012674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |
| WO | 2009/119224 A1 | 10/2009 |
| WO | 2013074499 A1 | 5/2013 |
| WO | 2013/106723 A2 | 7/2013 |
| WO | 2013/126996 A1 | 9/2013 |
| WO | 2015/068904 | 5/2015 |
| WO | 2017/053699 A1 | 3/2017 |
| WO | 2017/172953 A1 | 10/2017 |
| WO | 2018/005475 A1 | 1/2018 |
| WO | 2018/005717 A1 | 1/2018 |

OTHER PUBLICATIONS

"Security Enhanced EMV-Based Mobile Payment Protocol.pdf"; Ming-Hour Yang; Hindawi Publishing Corporation, The Scientific World Journal, vol. 2014, Article ID 864571, 19 pages. (Year: 2014).*
Notice of Allowance daterd Jan. 7, 2016, for U.S. Appl. No. 14/863,381, of Vadera, K., filed Sep. 23, 2015.
Non-Final Office Action dated Jul. 29, 2016, for U.S. Appl. No. 15/052,790, of Vadera, K., filed Feb. 24, 2016.
Non-Final Office Action dated Nov. 16, 2016, for U.S. Appl. No. 15/197,708, of Terra, D., et al., filed Jun. 29, 2016.
Notice of Allowance dated Nov. 23, 2016, for U.S. Appl. No. 15/052,790, of Vadera, K., filed Feb. 24, 2016.
Notice of Allowance dated May 18, 2017, for U.S. Appl. No. 15/086,024, of Steshenko, R., et al., filed Mar. 30, 2016.
Notice of Allowance dated Jun. 2, 2017, for U.S. Appl. No. 15/197,708, of Terra, D., et al., filed Jun. 29, 2016.
Non-Final Office Action dated Jul. 19, 2017, for U.S. Appl. No. 15/086,025, of Steshenko, R., et al., filed Mar. 30, 2016.
Final Office Action dated Dec. 5, 2017, for U.S. Appl. No. 15/086,025, of Steshenko, R., et al., filed Mar. 30, 2016.
Non-Final Office Action dated May 16, 2018, for U.S. Appl. No. 14/863,675, of Bota, O.I., et al., filed Sep. 24, 2015.
Notice of Allowance dated May 23, 2018, for U.S. Appl. No. 15/052,792, of Vadera, K., filed Feb. 24, 2016.
Notice of Allowance dated Jun. 6, 2018, for U.S. Appl. No. 15/086,025, of Steshenko, R., et al., filed Mar. 30, 2016.
Non-Final Office Action dated Jun. 15, 2018, for U.S. Appl. No. 15/197,711, of Terra, D., et al., filed Jun. 29, 2016.
International Search Report and Written Opinion for International Application No. PCT/US2016/053303, dated Dec. 7, 2016.
International Search Report and Written Opinion for International Application No. PCT/US2017/024802, dated Jun. 7, 2017.
International Search Report and Written Opinion for International Application No. PCT/US2017/039858, dated Sep. 8, 2017.
Non-Final Office Action dated Jan. 31, 2017, for U.S. Appl. No. 15/197,706, of Terra, D., et al., filed Jun. 29, 2016.
Advisory Action dated Nov. 30, 2017, for U.S. Appl. No. 15/197,706, of Terra, D., et al., filed Jun. 29, 2016.
Notice of Allowance dated Nov. 9, 2018, for U.S. Appl. No. 14/863,675, of Bota, O.I., et al., filed Sep. 24, 2015.
International Search Report and Written Opinion for International Application No. PCT/US2017/039480, dated Oct. 18, 2017.
Final Office Action dated Aug. 15, 2017, for U.S. Appl. No. 15/197,706, of Terra, D., et al., filed Jun. 29, 2016.
Final Office Action dated Jan. 15, 2019, for U.S. Appl. No. 15/197,711, of Terra, D., et al., filed Jun. 29, 2016.
Examiner Requisition for Canadian Patent Application No. 2,997,776, dated Mar. 7, 2019.
Decision to Grant a Patent Japanese Application No. 2018512995 dated Mar. 12, 2019.
Notice of Allowance dated May 8, 2019, for U.S. Appl. No. 15/197,711, of Terra, D., et al., filed Jun. 29, 2016.
Non-Final Office Action dated May 9, 2019, for U.S. Appl. No. 16/230,823, of Cat, M., et al., filed Dec. 21, 2018.
Notice of Allowance dated Jun. 21, 2019, for U.S. Appl. No. 15/197,711, of Terra, D., et al., filed Jun. 29, 2016.
"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
"MSP430x1xx Family User's Guide," (including 2016 correction sheet at 2), Texas Instruments Inc., 2006.
Spegele, Joseph Brain., "A Framework for Evaluating Application of Smart Cards and Related Technology Within the Department of Defense," Naval Postgraduate School, Jan. 1995.
Stephen A. Sherman et al., "Secure Network Access Using Multiple Applications of AT&T's Smart Card," AT&T Technical Journal, Sep./Oct. 1994.
Intention to Grant received for EP Application No. 17737677.9, dated May 15, 2020.
Decision to Grant a Patent received for Japanese Patent Application No. 2018-549254, dated May 25, 2020.
Decision to Grant a Patent received for Japanese Patent Application No. 2018-566533, dated Jun. 5, 2020.
Notice of Allowance dated Jun. 11, 2020, for U.S. Appl. No. 15/197,706, of Terra, D. et al., filed Jun. 29, 2016.
Final Office Action dated Sep. 18, 2019, for U.S. Appl. No. 16/230,823, of Cat, M., et al., filed Dec. 21, 2018.
Non-Final Office Action dated Mar. 25, 2020, for U.S. Appl. No. 16/230,940, of Cat, M., et al., filed Dec. 21, 2018.
Examination Report No. 1 for AU Application No. 2017290124 dated Feb. 20, 2020.
Notice of Reasons for Refusal for Japanese Patent Application No. 2018-566533 dated Feb. 21, 2020.
Decision to grant European Patent Application No. 16777868.7 dated Mar. 19, 2020.
Examination Report No. 1 for AU Application No. 2017245244 dated Apr. 22, 2020.
Notice of Allowance dated Apr. 22, 2020, for U.S. Appl. No. 16/230,823, of Cat, M., et al., filed Dec. 21, 2018.
Examination Report, for European Patent Application No. 17739802.1, dated Nov. 8, 2019.
Office Action for Japanese Patent Application No. 2018-549254, dated Nov. 11, 2019.
Notice of Allowance dated Nov. 13, 2019, for U.S. Appl. No. 16/153,649, of Steshenko, R., et al., filed Oct. 5, 2018.
Advisory Action dated Dec. 2, 2019, for U.S. Appl. No. 16/230,823, of Cat, M., et al., filed Dec. 21, 2018.
Examination Report No. 1 for Australian Patent Application No. 2017290567, dated Dec. 4, 2019.
Wyatt J., et al., "Improving Power Consumption in NFC and HF RFID Card Detection Systems," EETimes, May 24, 2013, www.eetimes.com/improving-power-consumption-in-nfc-and-hf-rtid-card-detection-systems/# (Year: 2013).
Notice of Allowance dated Jan. 28, 2020, for U.S. Appl. No. 16/153,649, of Steshenko, R., et al., filed Oct. 5, 2018.
Notice of Allowance dated Feb. 13, 2020, for U.S. Appl. No. 16/230,823, of Cat, M., et al., filed Dec. 21, 2018.
Notice of Allowance dated Mar. 5, 2020 for U.S. Appl. No. 15/197,706, of Terra, D., et al., filed Jun. 29, 2015.

(56) References Cited

OTHER PUBLICATIONS

Notice of Allowance dated Mar. 11, 2020, for U.S. Appl. No. 16/153,649, of Steshenko, R., et al., filed Oct. 5, 2018.
Non-Final Office Action dated Mar. 16, 2020, for U.S. Appl. No. 16/231,030, of Cat, M., et al., filed Dec. 21, 2018.
Examination Report, for European Patent Application No. 17737677.9, dated Jun. 14, 2019.
"Connection of Terminal Equipment to the Telephone Network," FCC 47 CFR Part 68, Retrieved from the URL: http://www.tscm.com/FCC47CFRpart68.pdf, on Sep. 24, 2019.
"Embedded FINancial transactional IC card READer," Retrieved from the URL: https://cordis.europa.eu/project/rcn/58338/factsheet/en.
Geethapriya Venkataramani and Srividya Gopalan., "Mobile phone based RFID architecture for secure electronic payments using RFID credit cards," 2007 IEEE, (ARES'07).
"Guideline for the Use of Advanced Authentication Technology," FIPS 190, Sep. 28, 1994.
"Identification cards—Recording technique—Part 4—Location of read-only magnetic tracks—Track 1 and 2," ISO/IEC 7811-4:1995, International Organization for Standardization, Aug. 1995.
"Implementation Full EMV Smartcard POS Transaction and Impact on PCI DSS.pdf"; Oludele Ogundele, Pavol Zavarsky, Ron Ruhl, u Dale Lindskog; 2012 ASE/IEEE International Conference on Social Computing and 2012 ASE/IEEE International Conference on Privacy, Security, Risk and Trust. (Year: 2012).
Jerome Svigals., "The Long Life and Imminent Death of the Mag-stripe Card," IEEE Spectrum, vol. 49, Issue 61, Jun. 2012.
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing-rev1.pdf Apr. 14, 2008.
Martha E. Haykin et al., "Smart Card Technology: New Methods for Computer Access Control," NIST Special Publication 500-157, Sep. 1988.
Notice of Acceptance for Australian Patent Application No. 2017290567, dated Sep. 30, 2020.
Notice of Acceptance for AU Application No. 2017245244 dated Oct. 7, 2020.
Corrected Notice of Allowability dated Jun. 25, 2020 for U.S. Appl. No. 15/197,706, of Terra, D., et al., filed Jun. 29, 2015.
Examination Report No. 2 for Australian Patent Application No. 2017290567, dated Jun. 30, 2020.
Final Office Action dated Jul. 13, 2020, for U.S. Appl. No. 16/231,030, of Cat, M. et al., filed Dec. 21, 2018.
Final Office Action dated Jul. 22, 2020, for U.S. Appl. No. 16/230,940, of Cat, M. et al., filed Dec. 21, 2018.
Corrected Notice of Allowability dated Jul. 29, 2020, for U.S. Appl. No. 15/197,706, of Terra, D. et al., filed Jun. 29, 2016.
Office Action for European Patent Application No. 17717976.9, dated Dec. 11, 2020.
Notice of Grant for Australian Patent Application No. 2017290567, dated Jan. 28, 2021.
Notice of Grant for AU Application No. 2017245244 dated Feb. 4, 2021.
Examination Report No. 2 for Australian Application No. 2017290124 dated Feb. 15, 2021.

* cited by examiner

PRELIMINARY ACQUISITION OF PAYMENT INFORMATION

BACKGROUND

Electronic payments may be performed in a variety of ways. A payment terminal may process payment transactions, and may interact with payment devices such as a payment card having a magnetic strip that is swiped in a magnetic reader of the payment terminal, a payment device having a Europay/Mastercard/Visa (EMV) chip that is inserted into a corresponding EMV slot of the payment terminal, and near field communication (NFC) enabled devices such as a smartphone or EMV card that is tapped at the payment terminal and transmits payment information over a secure wireless connection. The payment terminal may receive payment information from the payment device as well information about a transaction, and may communicate this information to a payment system for processing of the transaction.

Overall processing time for a payment transaction generally depends on how quickly electronic payment information may be communicated between a payment device and payment server, such as a server located at a financial institution. Communication durations may be affected by the amount of time between the time an authorization for a payment amount is requested from a payment device and the time that approval is received from a payment server, and delays in communication of such messages are common. Delays during payment transactions may result in issues for customers seeking to complete transactions and merchants hoping to complete sales. Because chip cards sometimes are physically inserted into a payment terminal during processing, delays in processing of chip card transactions may create particular discomfort or friction during payment transactions.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
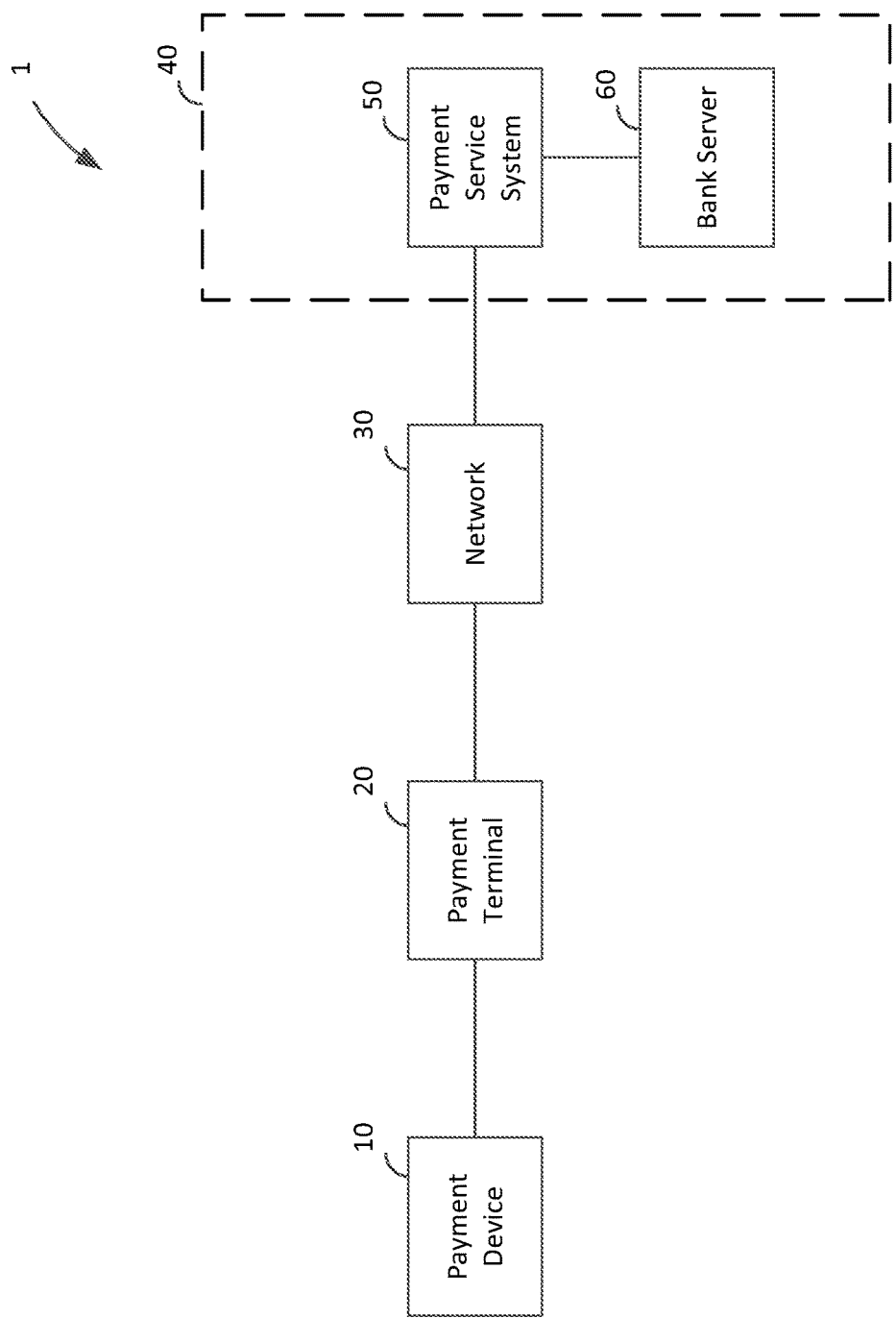
FIG. 1 shows an illustrative block diagram of a payment system in accordance with some embodiments of the present disclosure.

A payment system may include a payment terminal and a payment server. The payment terminal may have a payment reader and a merchant device. The payment reader receives payment information from a payment device such as an EMV chip card, a magnetic stripe card, or a NFC payment device. The merchant device has a point-of-sale application that provides a user interface for a merchant, and that communicates with the payment reader and payment server. The payment server processes transactions based on the payment information as well as other information (e.g., payment amount, merchant, location, etc.) received from the merchant device, and communicates a payment result (e.g., approval or denial) back to the merchant device.

The payment terminal may experience delays during a payment transaction, such as during exchange of payment information between the payment reader and the point-of-sale application of the merchant device, and between the point-of-sale application and the payment server. In an embodiment, information may be exchanged with the chip card prior to knowing with certainty a final amount of the customer charge in order to reduce or eliminate the delays. In this manner, this pre-charging may allow a significant amount of information to be exchanged with the chip card prior to the completing the transaction and sending a final approval to issuer and other servers for processing. At a certain point during the process of completing a payment transaction at a point-of-sale transaction, it may be likely that the transaction will eventually be completed. The merchant device may generate a pre-charge request at such a point of the point-of-sale application. The merchant device may send this pre-charge request to the payment reader for processing with the chip card.

The payment reader may receive the pre-charge request and, in response, exchange messages with the payment device (e.g., an EMV chip card) to acquire information such authorization information from the chip card. In some cases, the payment reader may exchange a plurality of electronic payment requests with the chip card, for example, to acquire a number of responses including different payment information (e.g., different authorization information, based on different payment amounts). In an embodiment, each of the plurality of electronic payment requests may include a preliminary payment amount to pre-charge the chip card. The preliminary payment amounts may be determined in a variety of ways and may be based on various information, such as a purchase history for a relevant item, item sales by a merchant employee, a merchant location, or a day and time of day. By requesting electronic payment of preliminary payment amounts from a chip card, payment authorization for the preliminary amounts may be available for comparing with an actual payment amount when an actual payment amount is determined.

The merchant device may receive an actual payment amount at the user interface once a payment amount to complete the transaction may be determined. The actual payment amount may be provided as a subsequent user input at the point-of-sale application. Once the actual payment amount is received, the merchant device may compare the actual payment amount to the preliminary payment amounts. When one of the preliminary payment amounts matches the actual payment amount, the merchant device may transmit the electronic payment information associated with the matching preliminary payment amount to a transaction processing server, for example, via a communication interface configured to communicate with the transaction processing server.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

In some embodiments, the payment server 40 may request information from the payment terminal 20, generate updates for reader management instructions and pre-charge instructions stored at the payment terminal 20 based on the information, and send the updates back to the payment terminal 20. The instructions of the payment terminal 20 may be executed by processors or other hardware of the payment terminal 0 in order to generally control the operations of the payment terminal and components thereof. In response to the request for information, the payment terminal 20 may gather information about the payment terminal 20, including information based on reader management instructions and pre-charge instructions stored in its memory, and generate a responsive message. In some embodiments, this message may be transmitted to the payment server 40 (e.g., the payment service system 50) for processing.

In some embodiments, payment server 40 (e.g., payment service system 50 of payment server 40) may receive information from a plurality of payment terminals 20 (e.g., each payment terminal 20 in communication with the network 30). The payment server 40 may update reader management or pre-charge instructions using information that may include historical information about payment transactions at the payment terminal 20, information about a user of the payment device, a transaction history of a customer, transactions conducted by similar merchants, or other similar transaction-related information. The payment server 40 may generate updated rules for reader management and pre-charge operations of the payment terminal 20 and update the reader management instructions and pre-charge instructions of the payment terminal 20.

Figure 2:
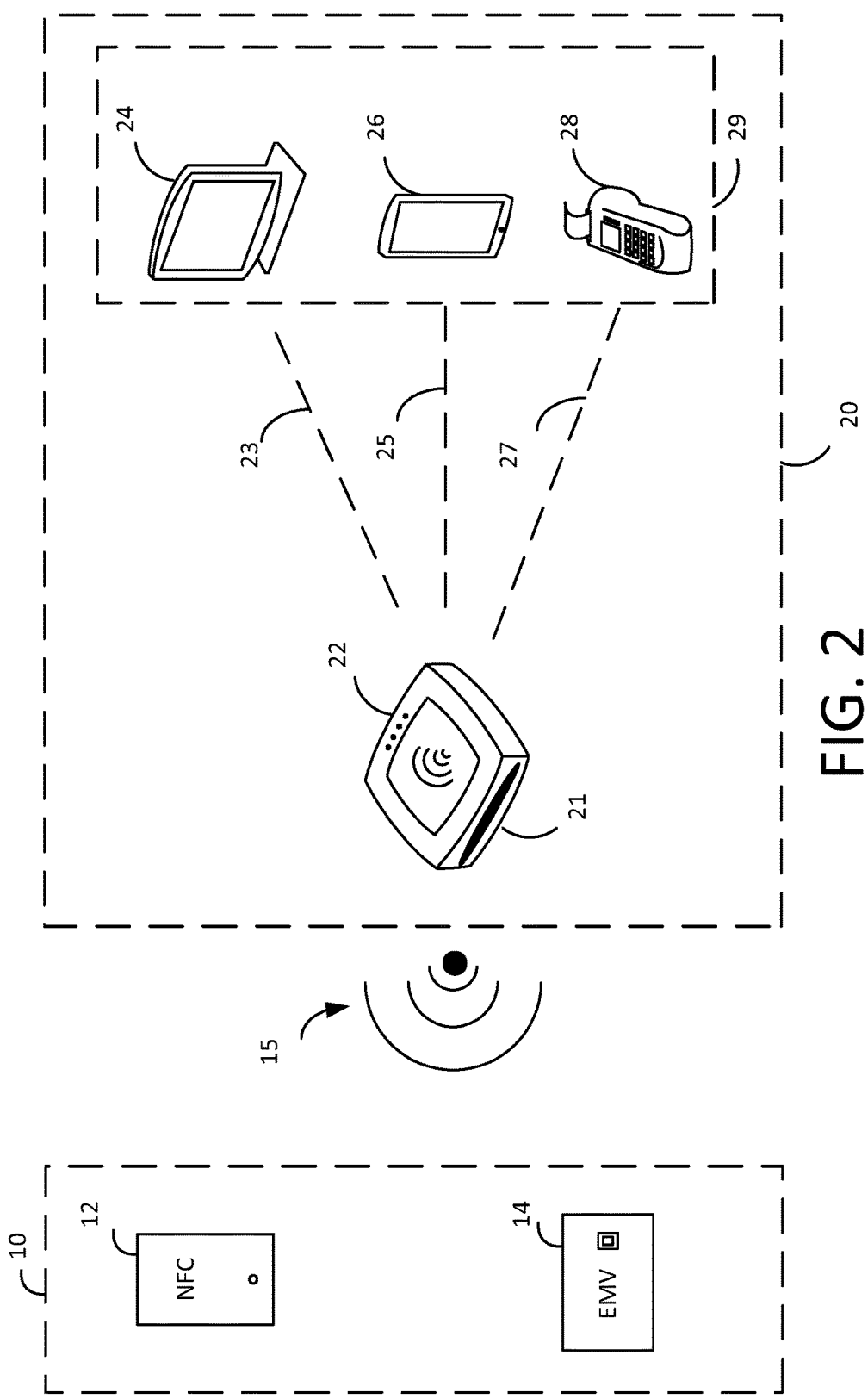
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to the entire payment terminal 20 or any suitable component of the payment terminal, such as payment reader 22 or merchant device 29. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
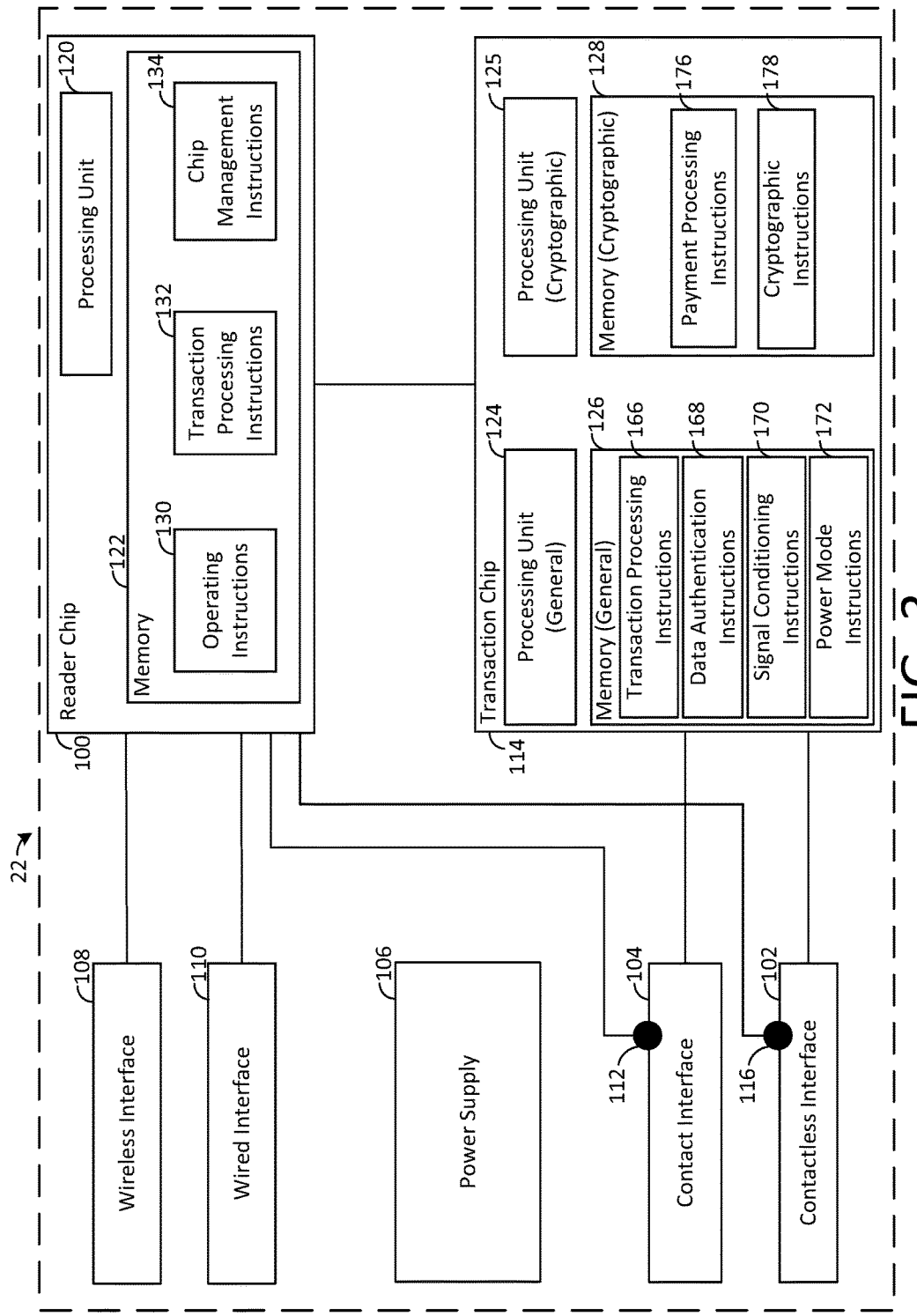
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may be a wireless communication device that communicates wirelessly with an interactive electronic device such as a merchant device 29, for example, using Bluetooth classic or Bluetooth low energy. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. In one embodiment, payment reader 22 includes a terminal chip (e.g., in a payment terminal 20 utilizing a payment reader, a reader chip 100, a plurality of payment interfaces (e.g., a contactless interface 102 and a contact interface 104), a power supply 106, a wireless communication interface 108, a wired communication interface 110, a chip card detection circuit 112, a transaction chip 114, and a NFC device detection circuit 116. Payment reader 22 may also include a processing unit 120 (e.g., a terminal/reader processing unit) and memory 122 in reader chip 100, and general processing unit 124, cryptographic processing unit 125, general memory 126 and cryptographic memory 128 in transaction chip 114. Although in one embodiment the processing units and memories will be described as packaged in a reader chip 100 and transaction chip 114 respectively, and configured in a particular manner, it will be understood that processing unit 120, general processing unit 124, cryptographic processing unit 125, memory 122, general memory 126, and cryptographic memory 128 may be configured in any suitable manner to perform the functionality of the payment reader 22 as is described herein. It will also be understood that the functionality of reader chip 100 and transaction chip 114 may be embodied in a single chip or a plurality of chips, each including any suitable combination of processing units and memory to collectively perform the functionalities of reader chip 100 and transaction chip 114 as described herein.

In some embodiments, reader chip 100 may be a suitable chip, such as a K21 chip supplied by Freescale Semiconductor, Inc. Processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions in any suitable number of memories and memory types. In some embodiments, processing unit 120 may have multiple independent processing units, for example a multi-core processor or other similar component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

Transaction chip 114 may include one or more processors having processing capability necessary to perform the processing functions described herein, including but not limited to hardware logic, computer readable instructions running on a processor, or any suitable combination thereof. In an exemplary embodiment, transaction chip 114 may perform functionality relating to processing of payment transactions, interfacing with payment devices, cryptography, and other payment-specific functionality. In some embodiments, transaction chip 114 may include a general processing unit 124 for executing instructions associated with general payment functionality and a cryptographic processing unit 125 for handling cryptographic processing operations. Each of general processing unit 124 and cryptographic processing unit 125 may have dedicated memory associated therewith (i.e., general memory 126 and cryptographic memory 128). In this manner, specific cryptographic processing and critical security information (e.g., cryptographic keys, passwords, user information, etc.), may be securely stored by cryptographic memory 128 and processed by cryptographic processing unit 125.

One or both of general processing unit 124 and cryptographic processing unit 125 of transaction chip 114 may communicate with reader chip 100 (e.g., processing unit 120), for example, using any suitable internal bus and communication technique. In this manner, reader chip 100 and transaction chip 114 can collectively process transactions and communicate information regarding processed transactions (e.g., with merchant device 29).

Transaction chip 114 may also include circuitry for interfacing with a contact interface 104 (e.g., power and communication circuitry for directly interfacing with an EMV chip of a chip card 14 that is inserted in slot 21). In some embodiments, transaction chip 114 may also include analog front end circuitry for interfacing with the analog components of contactless interface 102 (e.g., electromagnetic compatibility (EMC) circuitry, matching circuits, modulation circuitry, and measurement circuitry).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

In some embodiments, a wireless device detection interface may be a NFC device detection circuit 116 may be provided for the contactless interface 102, and may detect when an NFC device 12 comes into range of the contactless interface 102. In exemplary embodiments, a NFC device detection circuit 116 may include suitable hardware (e.g., antennas, switches, optical detection circuits, proximity sensors, etc.) for detecting the presence of a NFC device 12. In some embodiments, the NFC device detection circuit 116 may measure a proximity signal that varies when a NFC device 12 12 is positioned at a sufficiently close proximity and orientation with respect to contactless interface 102. In an embodiment, the tuning of circuitry of the NFC detection circuit (e.g., an antenna and tuning circuitry) may change (e.g. the circuitry may become detuned, as measured by the proximity signal). In some embodiments, NFC device detection circuit 116 may transmit a RF detection signal (e.g., a low power RF signal in a similar frequency range to the 13.56 MHz carrier signal) when the transaction chip is in the low-power mode, and the proximity determination may be based on a measured characteristic of a proximity signal (e.g., amplitude, power, envelope detection, etc.) that is based on the transmitted signal.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card 14 are able to exchange information such as payment information.

In some embodiments, a chip card detection circuit 112 may be provided for the contact interface 104, and may detect when a chip card 14 has been inserted into a chip card interface (e.g., card slot) of the contact interface 104. In exemplary embodiments, a chip card detection circuit 112 may include suitable hardware (e.g., switches, optical detection circuits, proximity sensors, etc.) for detecting the presence of a chip card 14 in the card slot of the contact interface 104. This signal may then be provided for processing by one or more other components of the payment reader 22 (e.g., reader chip 100 of payment reader 22).

In some embodiments, general processing unit 124 may include any suitable processor for performing the payment processing functionality of payment reader 22 described herein. In some embodiments, general memory 126 may be any suitable memory as described herein, and may include a plurality of sets of instructions for performing general transaction processing operations of payment reader 22, such as transaction processing instructions 166, data authentication instructions 168, signal conditioning instructions 170.

In some embodiments, transaction chip 114 may be configured to operate in a low-power mode and a transaction processing mode. In some embodiments, in the low-power mode, the transaction chip 114 may be neither powered nor operational. In other embodiments, transaction chip 114 may use a substantially reduced amount of power for carrying out limited operations, such as communicating with the reader chip 100. In such a mode, the transaction chip 114 may not provide power to any of the components that interface with contactless interface 102 and contact interface 104. Limiting the time during which the transaction chip 114 is fully powered and operating may result in a significant power savings. In some embodiments, the transaction chip 114 may remain in low-power mode until a wake-up request is received (e.g., from the reader chip 100), as described further below.

Transaction processing instructions 166 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Power mode instructions 172 may include instructions for operating transaction chip 114 in low-power mode and exiting the low-power mode when a wake-up request is received. In some embodiments, power mode instructions 172 may include instructions for transitioning the components of the transaction chip 114 from the low-power mode to the transaction processing mode in response to the wake-up request. In transaction processing mode, the transaction chip 114 may be powered and operational, and may be configured to request payment information from a payment device 10 (e.g., EMV chip card or wireless payment device). Power mode instructions 172 may include instructions for returning the transaction chip 114 to the low-power mode if certain conditions are met, for example, relating to transaction frequency, time of day, time since the previous transaction, battery level, etc. For example, no request for payment information is received from the reader 100 within a threshold wake-up period (e.g., 30 seconds) since the end of the previous payment transaction. Once returned to the low-power mode, the transaction chip 114 may remain in low-power mode until it receives the next wake-up request.

As described herein, while the power mode instructions are operating the transaction chip 114 in the normal power mode, transaction processing instructions 166 may include instructions for requesting and receiving payment information from a chip card via contact interface 104 or a wireless payment device via contactless interface 102 during the transaction processing mode. Based on the transaction processing instructions 166, the transaction chip 114 may request payment information from the payment device 10 during transaction processing mode in response to a request for payment information, such as from the reader chip 100. The reader chip 100 may request payment information in a number of circumstances, as described further below.

Data authentication instructions 168 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 168 may include configuration instructions such as TMS-CAPK instructions. In some embodiments, the TMS-CAPK may be tailored for a particular jurisdiction (e.g., country-specific).

Signal conditioning instructions 170 may include instructions for conditioning signals received from a payment device 10 via the contactless interface 102 (e.g., from a NFC payment device 10). Although in some embodiments, signal conditioning instructions 170 may include instructions for manipulating signals received via contactless interface 102, signal conditioning instructions 170 may include instructions for conditioning signals, including signals that are initially processed by signal conditioning hardware (not depicted in FIG. 3).

Cryptographic processing unit 125 may be any suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176 and cryptographic instructions 178. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a Texas Instruments CC2640 device, which may include a processing unit (not depicted) and memory (not depicted).

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components.

Wired communication interface 110 may include any suitable interface for wired communication with other devices or a communication network, such as USB, Lightning, FireWire, Ethernet, any other suitable wired communication interface, or any combination thereof. In some embodiments, wired communication interface 110 may allow payment reader to communicate with one or both of merchant device 29 and payment server 40.

Memory 122 of reader chip 100 may include a plurality of sets of instructions for controlling operations of payment reader 22, such as operating instructions 130, transaction processing instructions 132, and chip management instructions 134.

Operating instructions 130 may include instructions for controlling general operations of the payment reader 22, such as internal communications, power management, processing of messages, system monitoring, sleep modes, user interface response and control, operation of the wireless interface 108, operation of the transaction chip 114, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, by invoking the transaction chip 114 to process that payment information, and by generating responsive messages that are transmitted to the point-of-sale application of the merchant device via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100 and transaction chip 114) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with transaction chip 114 to perform most transaction processing operations.

In some embodiments of chip card transactions, payment reader 22 may acquire information from a chip card prior to the completion of a transaction (e.g., perform a "pre-charge") in a manner that may expedite chip card processing, thus decreasing the time to complete the transaction and the time that the chip card must be inserted into the contact interface 104. Transaction processing instructions 132 may include pre-charge instructions for communicating payment information with a payment device when performing pre-charge operations during a payment transaction. Transaction processing instructions 132 may provide instructions for acquiring any suitable information from a chip card (e.g., via transaction chip 114 and contact interface 104) such as authorization responses, card user name, card expiration, etc. In some embodiments, transaction processing instructions 132 may include instructions for providing preliminary charges to a chip card for processing by the payment reader 22. In some embodiments, the preliminary charge or charges may provide a dummy charge amount in order for the chip card to produce an authorization response (e.g., an authorization response cryptogram). Depending on when the pre-charge request is received from the merchant device 29, this authorization response may be transmitted back to the merchant device 29 (e.g., via wireless communication interface 108 or wired communication interface 110) prior to the merchant completing the payment transaction.

In some embodiments, it may be desired for an authorization response returned during pre-charge to be processed with a payment amount that matches the actual payment amount of the transaction to be completed by the merchant. Such a pre-charge may include acquiring a plurality of preliminary payment amounts for authorization by a chip card based on the transaction processing instructions 132. The reader chip 100 may receive each of the plurality of preliminary payment amounts in a message, such as from point-of-sale application at the merchant device 29 or payment server 40. As described in greater detail below, in some embodiments, the plurality of preliminary payment amounts may be determined arbitrarily and provided to the payment reader 22 for use by the reader chip 100. In other embodiments, the plurality of preliminary payment amounts may be derived based on predictive techniques using historical data for the merchant device 29, and in some embodiments, data from other payment terminals 20, as will be discussed further hereafter. The transaction processing instructions 132 may include instructions for continuing to provide preliminary charges until an actual payment amount is received (i.e., processing of payment information from the payment transaction is complete).

In other embodiments, the transaction processing instructions 132 may also include instructions for receiving an indicator that a charge request is a pre-charge request, may assign a priority to the indicator associated with the pre-charge request, and store the indicator and its assigned priority in memory, such as memory 122. In this regard, the reader chip 100 may prioritize or deprioritize a pre-charge request based on the indicator. In some embodiments, the reader chip 100 may secure authorization for each pre-charge request in order of priority (e.g., from highest to lowest prioritization). In some embodiments, transaction processing instructions 132 may include instructions for assigning priority proportionally with regard to a score assigned to a preliminary payment amount that is indicative of a likelihood that the preliminary payment amount will match an actual payment amount for the transaction. In yet other embodiments, the reader chip 100 may store and prioritize or deprioritize a request for payment information without regard to whether the request is a pre-charge request using instructions stored in transaction processing instructions 132.

Transaction processing instructions 132 may also include instructions for collecting information other than payment information before a charge is initiated during a payment transaction. For example, when a chip card is inserted into the contact interface 104 but before transaction chip 114 requests electronic payment information from (i.e., charges) the card, the reader chip 100 may collect other information needed for processing the payment transaction from the chip card, such as details about the chip card, an identity of a customer financing institution or issuer that issued the chip card, an account number, an expiration date of the chip card, or other information. In addition, transaction processing instructions 132 may include instructions for determining information about a customer using the payment device, including an identity of the customer, transaction history, or other information. In some embodiments, transaction processing instructions 132 may include instructions for collecting any suitable information from a payment device 10 prior to requesting electronic payment information or otherwise initiating a charge at the payment device 10.

Chip management instructions 134 may include instructions for managing operations of the transaction chip 114 of payment reader 22. Although particular functionality may be described as being performed by a particular component of reader 22, such as processing unit 120 of reader chip 100, it will be understood that any suitable component or combination of components of payment reader 22 may perform the operations described below to achieve the functionality described herein. In addition, although chip management instructions 134 may perform any suitable operations when executed by processing unit 120, in some embodiments, chip management instructions 134 may monitor interfaces of the payment reader 22 (e.g., wireless communication interface 108, wired communication interface 110, contact interface 104, contactless interface 102, and chip card detection circuit 112) for a wake-up signal, cause the processing unit 120 send a wake-up request to the transaction chip 114 in response to a received wake-up signal, receive a request to process payment (e.g., from a merchant device 29), and transmit the request for payment information to the transaction chip 114 in response to the request to process payment.

In some embodiments, chip management instructions 134 may include instructions for receiving and processing a wake-up signal and sending a wake-up request requesting transition of the transaction chip 114 from low-power mode to transaction processing mode. Chip management instructions 134 may include instructions for monitoring interfaces (e.g., wireless interface 108, wired interface 110, contact interface 104, contactless interface 102, chip card detection circuit 112, and NFC device detection circuit 116) of payment reader 22 and receiving a message, including a wake-up signal at an interface (e.g., a communication interface or other interface of the payment reader 22 capable of receiving a wake-up signal, or "wake-up input interface"). Although chip management instructions 134 may be used to receive a wake-up signal by any suitable communication method, in some embodiments, chip management instructions 134 may receive a message including a wake-up signal from wireless interface 108 (e.g., via a Bluetooth low energy message) or wired interface 110. Another exemplary wake-up signal may be provided by chip card detection circuit 112, which may provide a signal when a chip card is inserted into the chip slot of the contact interface. Yet another exemplary wake-up signal may be provided by the NFC device detection circuit 116 when a NFC device 12 is near in proximity to contactless interface 102 (e.g., when inductive coupling of an RF carrier signal occurs).

Another exemplary wake-up signal may be provided by sensors (not depicted in FIG. 3) which may include any suitable sensors (e.g., proximity sensors, infrared sensors, optical sensors, time-of-flight sensors, audio sensors, video sensors, etc.) which may be used to determine the likelihood that a transaction will occur in the near future. In an embodiment, a proximity sensor may determine that a device having properties similar to a smart phone is located in the area of the contactless interface 102. For example, proximity detection may be carried out by the NFC circuitry, based on an object in proximity detuning the NFC circuitry. In another embodiment, sensors may monitor customer queues to determine whether a customer is likely to engage in a transaction in the near future (e.g., based on dwell time, location, queue length, etc.).

In some embodiments, chip management instructions 134 may include instructions for receiving a wake-up signal from the merchant device 29 indicating that a wake-up request should be sent to the transaction chip 114 only upon occurrence of a specified condition (i.e., a contingent wake-up signal). Chip management instructions 134 may include instructions for receiving a contingent wake-up signal (e.g., at an interface of payment reader 22), determining whether the specified condition has been satisfied, and providing a wake-up request to the transaction chip 114 based on the determination. In some embodiments, examples of conditions that a contingent wake-up signal may specify as a basis for providing a wake-up request may include a determination that a power level that a power reserve level in power supply 106 is above a pre-defined threshold, a determination that a payment device (e.g., chip card or wireless payment device) may be likely interact with an interface of payment reader 22 (e.g., based on data from sensors), or other condition. Note that, in some embodiments, conditions may be updated as the firmware of the chip management instructions 134 are updated from time-to-time. In some embodiments, a wake-up signal may define a condition for providing a wake-up request with regard to one or more parameters derived using data analytics or other technique. As described herein, a parameter may be determined based on data analytics performed at the merchant device 29 (i.e., by the point-of-sale application) or at the payment server 40.

In some embodiments, chip management instructions 134 may include instructions for sending a wake-up request to transaction chip 114 in response to wake-up signal. Reader chip 100 (e.g., processing unit 120) may execute chip management instructions 134 to identify the type of wake-up signal provided to the reader chip 100 and determine whether to provide a wake-up request to the transaction chip. Reader chip 100 may execute chip management instructions 134 to provide a signal or message indicative of a wake-up request to the transaction chip 114, and the transaction chip 114 may transition from low-power mode to transaction processing mode in response to the wake-up request. In some embodiments, the reader chip 100 may execute chip management instructions 134 to provide a wake-up request immediately or upon determining an occurrence of an event identified by a message including a wake-up signal.

Chip management instructions 134 may also include instructions for coordinating power management with received wake-up signals. As the battery power of the payment reader 22 is dissipated, it may be desirable to limit the circumstances under which the payment reader 22 wakes up and/or to adjust the manner of the in which the payment reader 22 wakes up. In an embodiment, the chip management instructions may receive a power level measurement from the battery and may utilize that measurement with one or more thresholds to determine whether to wake up the transaction chip. For example, certain actions that cause a wake-up signal (e.g., foregrounding of a payment application or the presence of a queue of customers) may not result in removing the transaction chip 114 from the low power mode when the battery is less than a threshold (e.g., ½ or ⅓ of full power) while other actions (e.g., entry of an item at a point-of-sale application, insertion of a chip card, or proximity of a payment device to a contactless interface) may cause the transaction chip 114 to exit the low power mode. In some embodiments, the chip management instructions 134 may cause the transaction chip 114 to exit the low power mode based on cart activity (e.g., using a customer's cart activity as a heuristic for waking up transaction chip 114). In some embodiments, the criteria may include information based on addition of one or more items to a customer's cart. In some embodiments, the transaction chip 114 may exit the low power mode in response to restoration of an open ticket or other event.

Chip management instructions 134 may also manage a threshold wake-up period for the transaction chip 114. Once the wake-up of the transaction chip 114 is initiated, the chip management instructions may determine how long the transaction chip stays in the normal operating mode. In embodiments, this wake-up period may be dynamic based on the type of wake-up signal provided (e.g., foregrounding vs. active transaction, queue vs. card insertion) or based on other operational parameters such as battery life.

Figure 4:
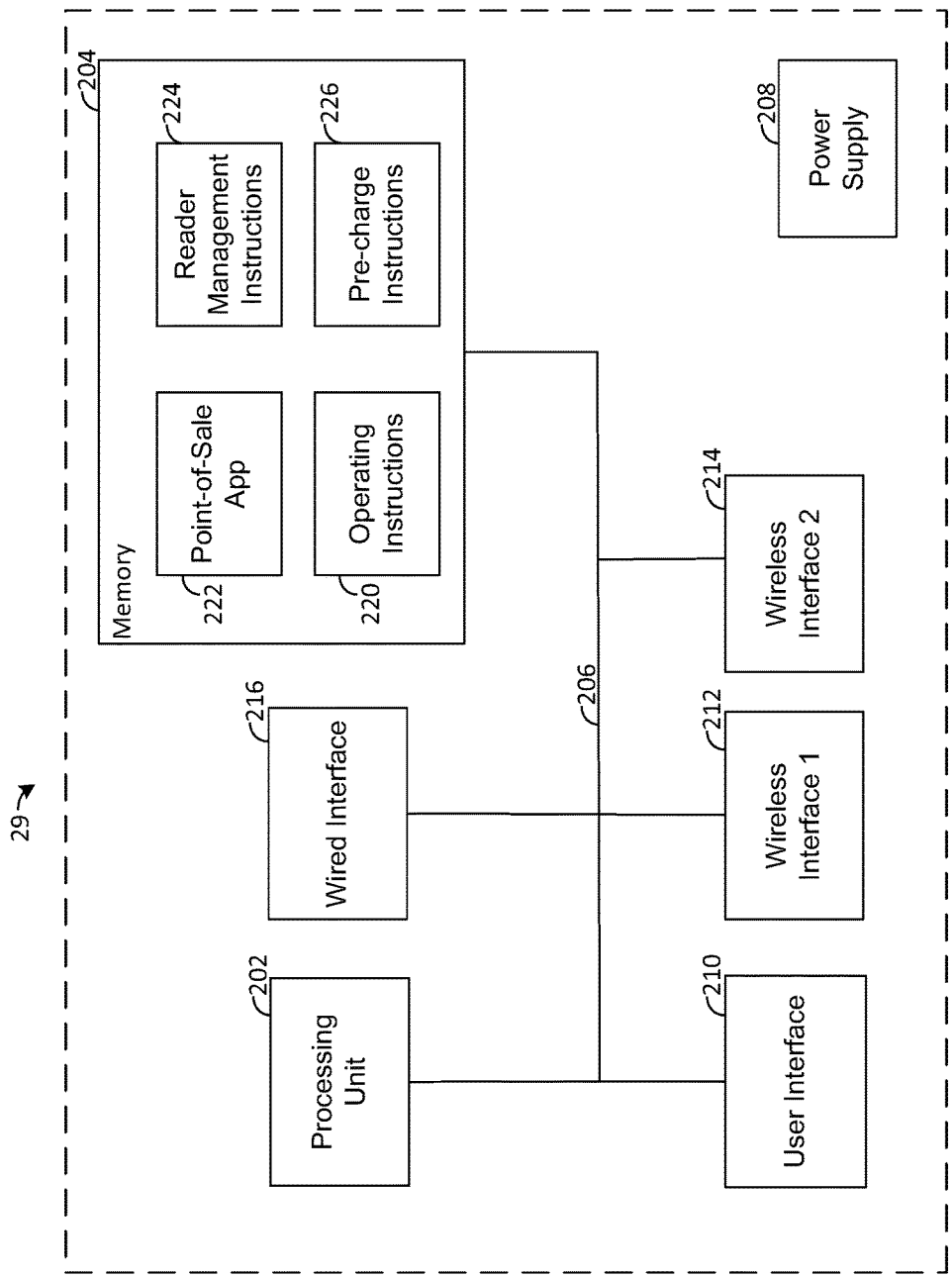
FIG. 4 depicts an illustrative block diagram of a merchant device in accordance with some embodiments of the present disclosure.

FIG. 4 depicts an exemplary merchant device 29 in accordance with some embodiments of the present disclosure. Although merchant device 29 may be implemented in any suitable manner, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, or any other suitable electronic device having the necessary user interface and communication capabilities to perform the functions described herein.

Although particular components are depicted in a particular arrangement in FIG. 4, it will be understood that merchant device 29 may include additional components, one or more of the components depicted in FIG. 4 may not be included in merchant device 29, and the components of merchant device 29 may be rearranged in any suitable manner. In one embodiment, merchant device 29 includes a processing unit 202, a memory 204, an interface bus 206, a power supply 208, a user interface 210, a first wireless interface 212, a second wireless interface 214, and a wired interface 216.

In one embodiment, the merchant device 29 includes a processing unit 202 and memory 204 that are configured to control and perform the necessary operations of the merchant device 29. In one embodiment, the processing unit 202 of may be a general-purpose processor running instructions for a mobile operating system, programs, and applications based on instructions that may be stored in memory 204. The memory 204 may include any suitable memory types or combination thereof as described herein, such as flash memory and RAM memory, for storing instructions and other data and providing a working memory for the execution of the operating system, programs, and applications of the merchant device 29. In one embodiment, the memory 204 may include a plurality of sets of instructions, such as operating instructions 220, point-of-sale application instructions 222, reader management instructions 224 and pre-charge instructions 226.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as I²C, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 4, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An exemplary user interface 210 may include hardware and software for any suitable user interface, such as a touchscreen interface, voice command interface, keyboard, mouse, gesture recognition, any other suitable user interface, or any combination thereof. In one embodiment, the user interface 210 may be a touchscreen interface that displays an interactive user interface for programs and applications such as a point-of-sale application running on the merchant device 29.

Merchant device 29 may also include a plurality of wireless communication interfaces. The wireless communication interfaces may include any suitable hardware and software for providing a wireless communication interface such as Bluetooth classic, Bluetooth low energy, WiFi, cellular, short message service (SMS), NFC, any other suitable wireless communication interface, or any combination thereof. In an embodiment, a first wireless communication interface 212 may be a wireless communication interface that communicates with payment reader 22 (e.g., Bluetooth low energy interface) while a second wireless communication interface 214 may be a wireless communication interface (e.g., WiFi) that communicates with a payment service system 50 of payment server 40 (e.g., via the internet).

Merchant device may also include a wired interface 216, which may include any suitable interface for wired communication with other devices (e.g., a payment reader 22) or a communication network (e.g., to contact a payment server 40), such as USB, Lightning, FireWire, Ethernet, any other suitable wired communication interface, or any combination thereof.

Operating instructions 220 of memory 204 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 220 may include instructions for controlling the operations of the user interface 210. The user interface 210 may be controlled in accordance with the instructions of programs and applications of the operating instructions 220, point-of-sale application instructions 222, reader management instructions 224, and pre-charge instructions 226. In one embodiment, the operating instructions 220 may include instructions to display information about an operating mode (e.g., low-power mode or transaction processing mode) of a payment reader 22 or other information about payment reader 22 based on reader management instructions 224 and point-of-sale application instructions 222. Operating instructions 220 may also include instructions for interacting with a payment reader 22 and for interacting with a payment service system 50 at a payment server 40. The payment reader 22 and/or the application running on the merchant device 29 may be known (e.g., via a registration process) to the payment service system 50, such that the merchant device 29 may process payments with the payment service system 50 according to the point-of-sale application instructions 222.

Point-of-sale application instructions 222 may include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations. In some embodiments, the point-of-sale application instructions 222 may include instructions for providing a rich display of information relating to settings for performing wake-up and pre-charge operations, for example, to modify wake-up thresholds and battery life settings for wake-up, and setting standard transaction amounts for pre-charge.

In some embodiments, point-of-sale application 222 may display a variety of graphical elements when a user opens the application. This "foregrounding" may include version information or other details about the point-of-sale application 222. In some embodiments, point-of-sale application 222 may provide a register interface to allow a user to enter a payment amount, select items for purchase, and modify purchase options by providing inputs at the user interface 230. The point-of-sale application 222 may remain in this mode until a user provides an input indicating that the user is ready to provide payment information for processing. In some embodiments, point-of-sale application 222 may prompt a user for selection of a payment method. The user may select a payment method based on an indication at the point-of-sale application 222, or by providing an input at the merchant device 29 or payment reader 22. In some embodiments, a payment method may be selected based on interaction of a payment device 10 with an interface of payment reader 22 (e.g., contact interface 104 or contactless interface 102). For example, in some embodiments, point-of-sale application 222 may include instructions for identifying a chip card when it is inserted into contact interface 104 based on a message provided by payment reader 22. In some embodiments, point-of-sale application 222 may include instructions for displaying a customer verification method for obtaining authorization to process a payment transaction on the payment method provided, such as through user input. In some embodiments, the verification method may be a number panel for entry of a unique personal identification number (PIN) or a cardholder's signature. Other methods may be used in other embodiments. In some embodiments, point-of-sale application 222 may provide an indicator that the transaction is complete following approval of the payment transaction at the merchant device 29, such as from a transaction processing server or based on a self-approval provided at the merchant device 29. Point-of-sale application may display the transaction complete indicator at the user interface 230, indicating that the transaction has concluded.

In some embodiments, point-of-sale application instructions 222 may include instructions for performing parallel processing of tasks performed during a payment transaction. For example, payment information from a payment device 10 may be collected and processed before a purchase amount is entered or a user begins selecting items for purchase. Following collection of the payment information, tasks such as customer verification methods and finalization of a payment amount may be completed at the point-of-sale application 222 prior to the completion of messaging with the chip card and/or authorization of the transaction. Thus, a continuous flow of tasks in a payment transaction may be provided to the user interface 230 by point-of-sale application 222, reducing transaction duration and customer wait time. In some embodiments, point-of-sale application instructions 222 may include instructions for performing any of the functions of point-of-sale application 222 described herein in parallel with payment processing tasks.

In some embodiments, point-of-sale application instructions 222 may include instructions for generating a pre-charge request at different stages of the payment process. As an example, pre-charge instructions 226 may include instructions for determining that a pre-charge request should be generated and provided when a user opens (e.g., foregrounds) the point-of-sale application 222 via the user interface, enters a first user input into an item selection interface, enters subsequent user inputs (e.g., provides user information), or completes a payment transaction. Pre-charge instructions 226 may include instructions for determining that a pre-charge request should be generated in response to other events in other embodiments.

In some embodiments, point-of-sale application instructions 222 may include instructions for receiving a transaction complete indicator in response to a user input received after a first user input at the point-of-sale application 222. The transaction complete indicator may be generated at various times during the transaction (e.g., when a user completes a payment transaction, after authorization, etc.), and may include information about the payment transaction. Point-of-sale application instructions 222 may include instructions for receiving the transaction complete indicator, which may include an actual payment amount of a payment transaction at the merchant device 29. Note that the transaction complete indicator may be received as a subsequent user input at point-of-sale application 222. The transaction complete indicator may be provided and received in response to other events in other embodiments.

Reader management instructions 224 may include any suitable instructions for assisting with managing operations of the payment reader 22 as described herein, including instructions for generating and providing a wake-up message to the payment reader 22. In some embodiments, the wake-up message may be generated based on information received at the point-of-sale application 222. For example, in some embodiments, reader management instructions 224 may generate a wake-up message based on the progress of the transaction and other information relevant to the likelihood that a transaction action likely to occur. Exemplary other information may include information such as an employee operating the merchant device, a customer queue, a time of day, information relating to other merchants, and any other suitable information as described herein. Reader management instructions 224 may include instructions for generating a wake-up message based on these inputs (e.g., inputs to a point-of-sale application and other relevant information). As an example, a customer may select an item for purchase and present the item to a cashier or clerk of the merchant for check out. The cashier or clerk may locate a corresponding item identifier at the merchant device 29, such as using point-of-sale application 222, and select the identifier. The point-of-sale application 222 may receive the item selection, and reader management instructions 224 may include instructions to determine that a sale and corresponding payment transaction are likely to occur based on the selection. Reader management instructions 224 may include instructions for providing the wake-up message to the reader 22 in response.

In some embodiments, reader management instructions 224 may include instructions for generating and providing the wake-up message based on a level of progress of a payment transaction at a merchant device 29, such as a determination that an order has begun at point-of-sale application 222, or other event. For example, reader management instructions 224 may include instructions for determining the level of progress of the payment transaction and, if the level of progress exceeds a threshold (e.g., a threshold indicating a request for payment information may be imminent), providing a wake-up message to the reader. In one embodiment, reader management instructions 224 may include instructions for generating and providing the wake-up message based on foregrounding of the point-of-sale application 222, or when a user opens the point-of-sale application 222 and it becomes active on the merchant device 29.

Reader management instructions 224 may include instructions for providing a wake-up message when interaction between the merchant device 29 and reader 22 begins. In some embodiments, a wake-up message may be generated when a connection between the merchant device 29 and reader 22 is established, such as via Bluetooth low energy connection at wireless interface 212. In one embodiment, a wake-up message may be generated based on a first input provided by a user at the point-of-sale application 222. In addition, the reader management instructions 224 may include instructions for generating a message when the point-of-sale application 222 a request to process payment to the reader 22.

In some embodiments, reader management instructions 224 may include instructions based on rules for providing a wake-up message to reader 22 determined at payment server 50 and provided to merchant device 29. In some embodiments, reader management instructions 224 may include instructions for providing a wake-up message based on various tasks that may occur at the merchant device 29, such as events that occur in a payment transaction process flow. For example, reader management instructions 224 may include instructions for providing a wake-up message based on local events at the merchant device 29, such as information about a customer (e.g., customer identity) or cashier (e.g., employee identity or responsibility). In some embodiments, rules provided by payment server 50 and included in reader management instructions 224 may be based on patterns identified at payment server 50 using information provided from other payment terminals 40, as described further below. In this regard, in some embodiments, reader management instructions 224 may include instructions for providing a wake-up message based on time of day, merchant location, purchased item type, activities at similar merchant locations, transactions at similar stores, or other information.

In an embodiment, the wake-up message could be based in part based on a transaction mix for the merchant. Some merchants may engage in a large percentage of cash transactions in general, during certain times of day, for certain transactions (e.g., for purchase of certain items), a recent trend of transactions, or based on other similar criteria. When a probability that a transaction will be cash is less than a threshold, the wake-up message may be sent. In some embodiments, the threshold may be modifiable or overridden by a merchant.

In some embodiments, reader management instructions 224 may include instructions for providing the wake-up message to the payment reader 22 based on the information above combined with information about reader 22. As an example, reader management instructions 224 may include instructions for providing a wake-up message based on a power level of power supply 106 of the payment reader 22 (e.g., received via a message from the payment reader 22). If the level of power source 106 exceeds a threshold, reader management instructions 224 may include instructions for establishing a level of progress of a payment transaction at the merchant device 29 required to provide the wake-up message. If the level of power supply 106 falls below a threshold, reader management instructions 224 may include instructions for increasing the level of progress required to provide the wake-up message. In this regard, the wake-up message may be provided later in the transaction process, and the transaction chip 114 may operate in transaction processing mode for a reduced amount of time, reducing power consumed from the power supply 106 during the transaction.

In some embodiments, reader management instructions 224 may include instructions for including information in a wake-up message about a wake-up threshold amount of time transaction chip 114 should operate in transaction processing mode. In some embodiments, the amount of time may be based on information such as an elapsed time since a teller or cashier provided an input at the point-of-sale application 222, an item selected for purchase, a level of power remaining in power supply 106, or other factors. The reader management instructions 224 may include instructions for determining a duration for which transaction chip 114 will remain in transaction processing mode. In other embodiments, reader management instructions 224 may include instructions for determining an amount of time for transaction chip 114 to operate in transaction processing mode based on other information.

Pre-charge instructions 226 may include any suitable instructions for assisting with pre-charge operations at the payment reader 22, including instructions for determining that a pre-charge request should be provided to the payment reader 22, determining a pre-charge procedure, determining a preliminary payment amount to include in the pre-charge request, receiving and storing an authorization information response from the payment reader 22, and comparing an authorized preliminary payment amount with an actual amount when the transaction is complete to identify a match, and transmitting the authorization information response associated with the matching preliminary payment amount to one or more transaction processing servers.

In some embodiments, pre-charge instructions 226 may include instructions for determining a pre-charge procedure for payment reader 22. For example, pre-charge instructions 226 may include instructions for determining that a pre-charge is permitted for a transaction based on information about the transaction, such as time of day, a number of customers waiting to check out, probable purchase volume, purchase amount or purchased item. Pre-charge instructions 226 may include instructions for determining that a pre-charge is permitted based on information about a payment device 10, such as a payment device that may require a preliminary payment amount to match an actual payment amount in order to provide an authorization information response to a pre-charge request. In this regard, pre-charge instructions 226 may include instructions for predicting a preliminary payment amount that may match an actual payment amount for the transaction, as described further below.

In some embodiments, pre-charge instructions 226 may include instructions for determining a preliminary payment amount to include in a pre-charge request. In some embodiments, the preliminary payment amount may be an amount for which authorization by a payment device 10 is requested, such as a chip card. Pre-charge instructions 226 may include instructions for determining a preliminary payment amount based on various techniques. In one embodiment, the preliminary payment amount may be based on an arbitrary amount, such as when a chip card does not require authorization of an actual transaction amount before providing a payment authorization. The arbitrary amount may be determined using any appropriate technique and included in a pre-charge request.

Pre-charge instructions 226 may include instructions for providing a pre-charge request to payment reader 22. Each pre-charge request may be associated with a preliminary payment amount, and may include a request for authorization information (e.g., EMV authorization cryptogram or authorization response code or "ARQC"). In some embodiments, pre-charge instructions 226 may include instructions for sending a plurality of additional pre-charge requests to contact interface 104 (via communications with payment reader 22). In this regard, each of the additional pre-charge requests may comprise a unique preliminary payment amount, determined as described herein. Pre-charge instructions may include instructions for providing the plurality of additional pre-charge requests until an occurrence of an event, such as until the transaction complete indicator is received at the user interface 230 via the point-of-sale application 222. The plurality of additional pre-charge requests may be provided until an occurrence of another event in other embodiments.

In some embodiments, pre-charge instructions 226 may include instructions for determining pre-charge amount in advance based on speculation or a prediction of what an actual payment amount for the transaction will be. For example, pre-charge instructions 226 may include instructions for determining a preliminary payment amount based on a probability that a preliminary payment amount will match an actual payment amount. In some embodiments, a histogram of previous payment amounts may be used to predict a preliminary payment amount. In an embodiment, the preliminary payment amount may be determined iteratively, for example, applying techniques such as machine learning. Initially, an amount may be selected for a pre-charge request without additional information about purchase amounts from transactions conducted at the merchant device 29. Over time, pre-charge instructions 226 may include instructions for basing a preliminary payment amount on actual payment amounts from previous transactions. In this regard, the preliminary payment amount may be determined based on previous payment amounts. A preliminary payment amount may converge to an amount close to an actual payment amount for a given situation if sufficient iterations have occurred. Other iterative techniques may be used to determine the preliminary payment amount in other embodiments.

In some embodiments, pre-charge instructions 226 may include instructions for determining a preliminary payment amount based on information gathered by payment reader 22. In some embodiments, the information may include information relevant to selection of a preliminary payment amount that may match an actual payment amount, such as a time of day of the payment transaction, a merchant location, information about an item purchased, identity of a customer, identity of a cashier or clerk, location of the payment reader 22, or other information. A preliminary payment amount may be determined using any suitable information available at payment reader 22 in other embodiments.

In some embodiments, pre-charge instructions 226 may include instructions for determining a preliminary payment amount using rules provided from payment service system 50. In some embodiments, the rules may be provided based on analysis of information such as payment amounts from previous transactions, a histogram of payment amounts, customer information, product information, or similar information from transactions conducted at other merchant locations. In some embodiments, pre-charge instructions 226 may include instructions for determining the preliminary payment amount using other information provided from payment service system 50, as described further below.

In some embodiments, pre-charge instructions 226 may include instructions for acquiring an authorization information response from a chip card interface (e.g., contact interface 104) in response to a pre-charge request but before the payment transaction is completed. In some embodiments, the authorization information response may indicate that payment of a preliminary amount is approved, such as when an amount is less than local approval amount of a chip card. In an exemplary embodiment, pre-charge instructions 226 may receive and store the authorization information responses, such as in memory 204. In some embodiments, pre-charge instructions 226 may include instructions for receiving additional authorization information responses, such as when additional pre-charge requests including additional preliminary payment amounts are provided to the chip card interface. Pre-charge instructions 226 may include instructions for storing the additional authorization information responses in memory 204.

Pre-charge instructions 226 may include instructions for comparing an actual payment amount in a payment transaction with each preliminary payment amount for which an authorization information response is stored in memory 204 to identify a match. In some embodiments, merchant device 29 may receive the actual payment amount from the point-of-sale application 222, such as following a user input subsequent to a user input for which a pre-charge request was provided. In some embodiments, merchant device 29 may receive the actual payment amount, and the processing unit 302 may execute pre-charge instructions 226 to identify a match between the actual payment amount and a preliminary payment amount associated with an authorization information response stored in memory. In some embodiments, the pre-charge instructions 226 may include instructions to identify a match by simple comparison of values or otherwise. When one of the preliminary payment amounts matches the actual payment amount, the merchant device 29 may transmit the authorization information response associated with the matching preliminary payment amount to one or more transaction processing servers for processing, such as payment service system 50 of payment server 40. In an exemplary embodiment, the merchant device 29 may transmit the authorization information response in response to a transaction complete indicator provided in response to a subsequent user input at the point-of-sale application 222 based on pre-charge instructions 226. In an exemplary embodiment, the electronic payment information may be transmitted via a communication interface 310 of the merchant device.

Figure 5:
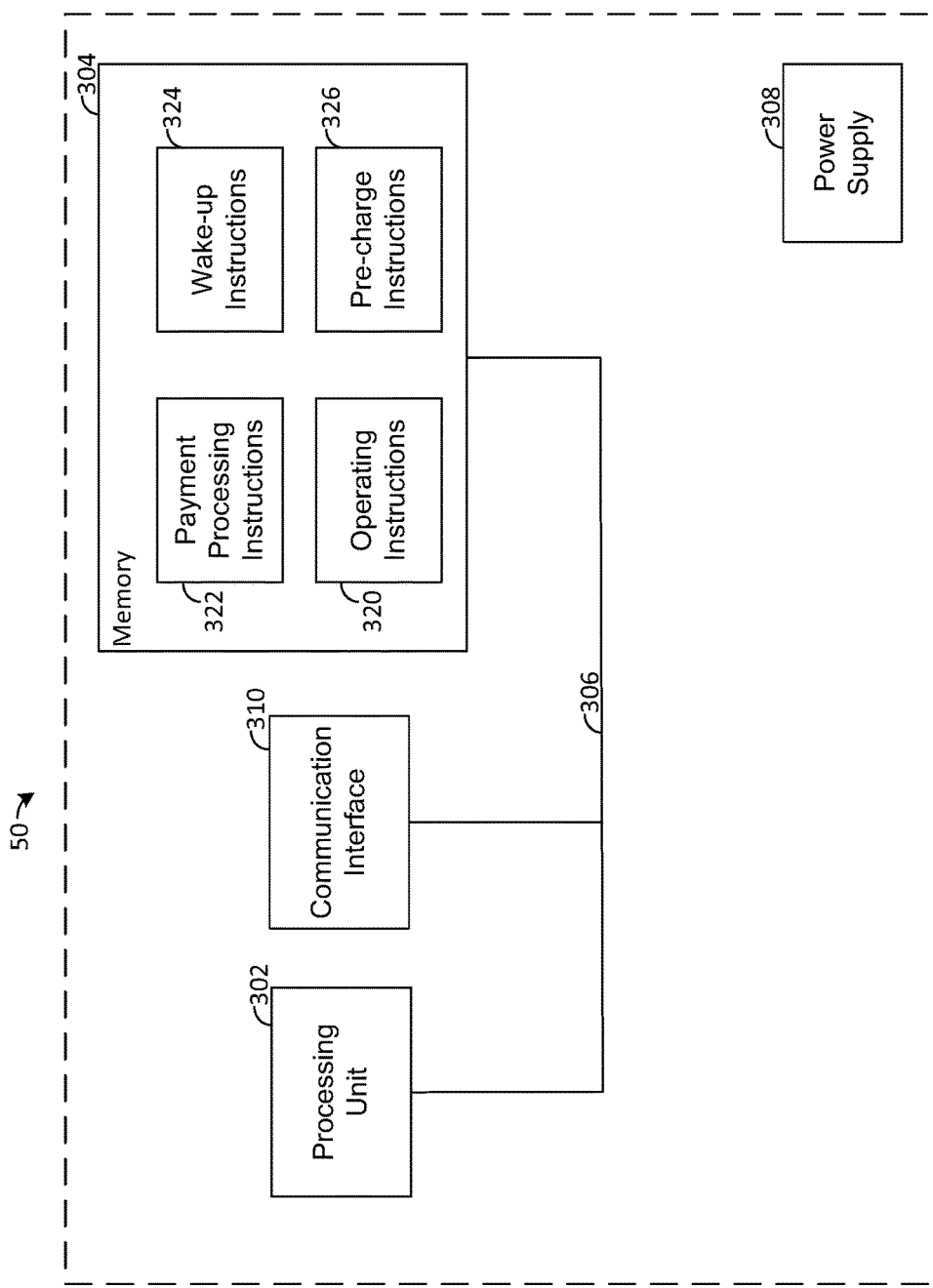
FIG. 5 depicts an illustrative block diagram of a payment service system in accordance with some embodiments of the present disclosure.

FIG. 5 depicts an exemplary payment service system 50 of a payment server 40 in accordance with some embodiments of the present disclosure. Although the payment service system 50 is depicted as a single server, it will be understood that the operations and memory of the payment service system 50 may be distributed over any suitable number of servers. Although particular components are depicted in a particular arrangement in FIG. 5, it will be understood that the payment service system 50 may include additional components, one or more of the components depicted in FIG. 5 may not be included in the payment service system 50, and the components of payment service system 50 may be rearranged in any suitable manner. It also will be understood that, in some embodiments, payment service system 50 may include the necessary components and have the necessary configuration to perform any of the functionality attributed to the payment server 40 herein. In one embodiment, payment service system 50 includes at least a processing unit 302, a memory 304, an interface bus 306, a power supply 308, and a communication interface 310.

In one embodiment, the payment service system 50 includes a processing unit 302 and memory 304 that are configured to control and perform the necessary operations of the payment service system 50. In one embodiment, the processing unit 302 of may be a high-speed processor running instructions for an operating system for the server, programs, and applications based on instructions that may be stored in memory 304. The memory 304 may include any suitable memory types or combination thereof as described herein for storing instructions and other data and providing a working memory for the execution of the operating system, programs, and applications of the payment service system 50. In one embodiment, the memory may include a plurality of sets of instructions, including but not limited to operating instructions 320, payment processing instructions 322, wake-up instructions 324, and pre-charge instructions 326.

The processing unit 302 may execute the instructions of memory 304 to interact with and control one or more other components of the payment service system 50. Although the processing unit 302 may communicate with other components of the payment service system 50 in any suitable manner, in one embodiment the processing unit 302 may utilize an interface bus 306. Interface bus 306 may include one or more communication buses such as I$^2$C, SPI, USB, UART, and GPIO. In one embodiment, the processing unit 302 may execute instructions of the memory 304 and based on those instructions may communicate with the other components of the payment service system 50 via the communication buses of interface bus 306.

The payment service system 50 may also include a power supply 308. Power supply 308 may include power conversion circuitry for converting AC power and/or generating a plurality of DC voltages for use by components of the payment service system 50. In some embodiments, power supply 308 may include a backup system such as a battery backup, to avoid interruptions in service during power outages. Although not depicted as physically connected to the other components of the payment service system 50 in FIG. 5, power supply 308 may supply a variety of voltages to the components of the payment service system 50 in accordance with the requirements of those components.

The payment service system 50 may also include a communication interface 310. Although communication interface 310 may include any suitable communication interface or combination thereof, in some embodiments the communication interface 310 may utilize higher speed communication interfaces such as WiFi, cellular, Ethernet, or fiber optics. The communication interface 310 may establish a secured connection (e.g., via TLS or SSL) with a payment terminal 20 (e.g., merchant device 29) in order to exchange messages relating to wake-up and pre-charge procedures. The communication interface 310 may also communicate with other servers of the payment server 40 such as transaction processing servers, which may, in some embodiments, be located remotely from the payment service system 50 and operated by different entities than those that control the payment service system 50. For example, in one embodiment, the payment service system 50 may be operated by an entity that provides one or more of the payment reader 22, merchant device 29, or point-of-sale application 222. Transaction processing servers may be associated with and operated by one or more of the merchant, issuer, or customer banks.

Operating instructions 320 may include instructions for controlling any suitable general operations of the payment service system 50, such as internal communications, power management, control of communication devices, control of other hardware of the payment service system 50, any other suitable instructions, or any combination thereof. In one embodiment, the operating instructions may provide instructions for the operating system of the payment service system 50 as well as most drivers, programs, and applications operating on the payment service system 50.

Operating instructions 320 may also include instructions for interacting with a merchant device 29. In one embodiment, the payment service system 50 may communicate with the merchant device 29 via the communication interface 310. Operating instructions 320 may include instructions that when executed by processing unit 302 control these communications and provide for secure communication by implementing procedures such as TLS, SSL or as encrypted data based on keys.

Payment processing instructions 322 include instructions for processing payments, and may control the content of messages that are communicated to the merchant device 29, payment reader 22 (e.g., via merchant device 29), and/or transaction processing servers. In one embodiment, the payment processing instructions may include information about each payment reader 22 and merchant device 29 having an installed point-of-sale application 222. In addition to performing payment processing functions such as providing payment information such as amount and a credit card number to a transaction processing system and communicating responses back to the merchant, the payment service system 50 may also perform complex analysis of merchant data that may be used to provide reports, metrics, or other data to a merchant (e.g., a merchant operating a plurality of merchant devices 29 at a plurality of locations).

Wake-up instructions 324 may include instructions for determining rules for providing wake-up messages to payment readers 22 (e.g., sending the rules to the merchant device 29 via network 30) that are in communication with the payment service system 50. Although the discussion herein includes processing at both payment service system 50 and merchant device 29, it will be understood that some or all aspects of wake-up instructions 324 may be executed at merchant device 29, and that some aspects of reader management instructions 224 may be executed at payment service system 50.

In some embodiments, thousands or even millions of payment terminals 20 or similar devices may be in communication with payment service system 50, and may provide information about the payment terminals 20 themselves as well as payment transactions that occur at the payment terminals 20, as well as other information. Based on the information provided, payment service system 50 may update rules stored in wake-up instructions 324 and pre-charge instructions 326, and may provide updates for payment terminals 20 from time-to-time, such as to improve functionality of the payment terminal, or to facilitate more efficient processing of payment information during payment transactions. More specifically, information stored at payment server 50 may allow wake-up instructions 324 and pre-charge instructions 326 to update instructions stored in memory at merchant device 29 and payment reader 22 for performing wake-up tasks at the transaction chip 114 and carrying out pre-charge authorization in a payment transaction at the payment terminal 20.

In some embodiments, wake-up instructions 324 may include instructions for generating rules for controlling operations of a transaction chip 114 in payment reader 22. In some embodiments, payment service system 50 may use information stored in wake-up instructions 324 to update chip management instructions 134, power mode instructions 172, and reader management instructions 224. In some embodiments, the rules may provide various procedures, steps, and thresholds for sending wake-up requests to the transaction chip 114 from one or both of the merchant device 29 or reader chip 100. Wake-up instructions 324 may generate rules based on a particular set of criteria and update the rules based on changes to the criteria.

In one embodiment, criteria for rules stored in wake-up instructions 324 may be updated from time-to-time based on information about payment readers 22 in communication with payment service system 50. The information may include metrics about numerous payment terminals 20 engaging in similar transactions (e.g., based on other terminals of the same merchant, type of merchant, geographical location, time frame, etc.). In some embodiments, rules in wake-up instructions 324 may be updated based on information such as merchant type, similar merchants, similar merchant locations, an average battery life of payment readers 22, average number of transactions per charge, an average length of time the transaction chip 114 of payment readers 22 remained in transaction processing mode without receiving a request for payment information, number of times a threshold level of progress for providing a wake-up message to a payment reader 22 increased or decreased based on a power level of a battery, and other information.

In some embodiments, criteria for rules stored in wake-up instructions 324 may be for a particular payment terminal 20, and may be updated based on information about the particular payment terminal 20. In this regard, wake-up instructions 324 may include metrics about the payment terminal 20, such as merchant information, location, information about its components, employees, queues, battery life, software or other information. In some embodiments, rules stored in wake-up instructions 324 may be updated with information about an average battery life of payment reader 22, transaction execution times, time of day for transactions, most frequently used payment methods at the payment terminal 20, average time between charges of the power supply 106 of payment reader 22, average number of wake-up messages sent and received, a length of time when the transaction chip 114 remained in transaction processing mode while waiting for a request for payment information, or other similar information.

Pre-charge instructions 326 may include instructions for generating rules for carrying out pre-charge operations at a payment terminal 20. In some embodiments, payment service system 50 may use information stored in pre-charge instructions 326 to update instructions stored at payment terminal 20, such as point-of-sale application 222 and pre-charge instructions 226. In some embodiments, pre-charge instructions 326 may receive information about transactions at various payment terminals 20 in communication with payment service system 50. The information may include information about payment devices 10 used at the payment terminals 20, transaction information, payment amounts, transaction frequency, merchant type, merchant location, rates of approvals or denials of payment authorization requests, transaction times, or other information. Although particular information is discussed as being used to generate and update rules stored in pre-charge instructions 326, it will be understood that other information is possible.

In some embodiments, pre-charge instructions 326 may include instructions for generating and updating criteria for rules for a particular payment terminal 20 based on information received about the payment terminal 20. For example, pre-charge instructions 326 may include criteria such as a frequency of chip card use at the payment terminal 20, transaction amounts, transaction amounts by user, common orders, merchant type, location, customer identification, merchant employee or cashier, time of transaction, or other information specific to the particular payment terminal 20. Based on this information, updates regarding pre-charge procedures (e.g., predictive pre-charge amounts, use of customer information to predict transaction amounts, etc.) may generated by pre-charge instructions 326. In some embodiments, pre-charge instructions 326 may include instructions for updating instructions stored in memory of payment terminal 20 (e.g., point-of-sale application 222 and pre-charge instructions 226) from time-to-time based on the updates to these pre-charge procedures.

In some embodiments, wake-up instructions 324 and pre-charge instructions 326 may include instructions for performing analytics with regard to information stored at payment service system 50 to generate updated instructions for a plurality of payment terminals 20. While limited examples of analytics performed by instructions stored at payment service system 50 will be discussed herein, it will be understood that, in some embodiments, analytics may be performed by instructions stored at payment service system 50 of any suitable information for generating, updating, providing, or creating instructions for payment system 1 and its individual components for achieving the functionality described herein. In addition, analytics performed at payment service system 50 may be performed by any instructions or combination of instructions stored in memory, and while examples may be provided of performance of analytics by specific instructions, it will be understood that similar analytics of any information described herein may be performed by any instructions or combination of instructions stored in memory at the payment system 1.

As an example of the foregoing discussion regarding analytics, in some embodiments, the analytics performed may include application of techniques such as machine learning to data stored at the payment service system 50. For example, wake-up instructions 324 may determine that instructions stored at a payment terminal 20 for determining an update is required to a threshold power level of payment reader 22 for sending a wake-up request to the transaction chip 114. Wake-up instructions 324 may include instructions for accessing data regarding threshold power levels for a plurality of payment readers 22 of payment terminals 20 in communication with the payment service system 50, as well as data regarding previous threshold power levels at the particular payment reader 22 for which an update is required. Wake-up instructions 324 also may access additional information, such as transaction progress levels, average transaction duration, merchant information, or other suitable information. Wake-up instructions 324 may apply algorithms such as machine learning algorithms to the information and generate updated rules included in instructions stored at the payment terminal 20 where the particular payment reader 22 is located. Wake-up instructions 324 may provide the updated rules to the payment terminal 20 for storage in memory as an update to relevant instructions, such as chip management instructions 134, power-mode instructions 172, or reader management instructions 224.

Figure 6:
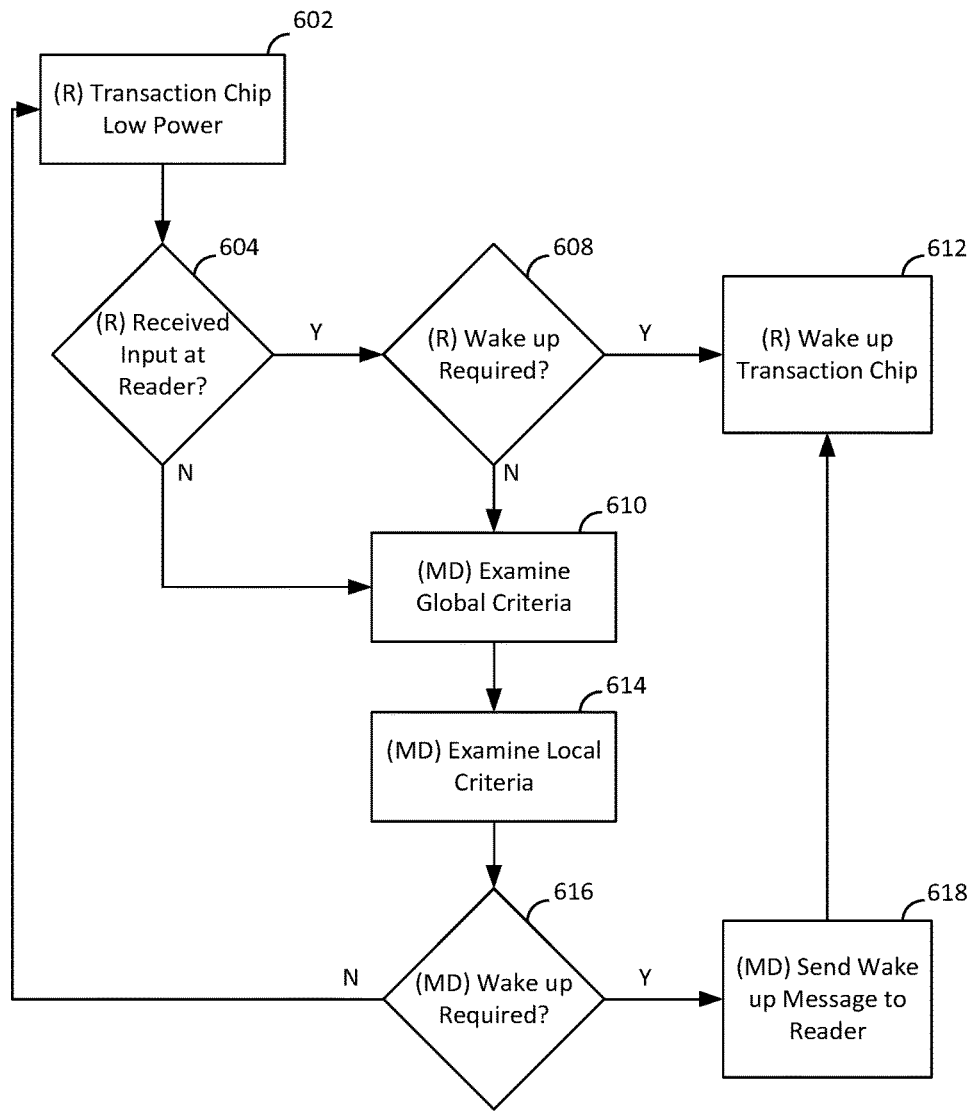
FIG. 6 depicts a non-limiting flow diagram illustrating exemplary methods for enabling transaction processing circuitry at a payment reader in accordance with some embodiments of the present disclosure.
Figure 7:
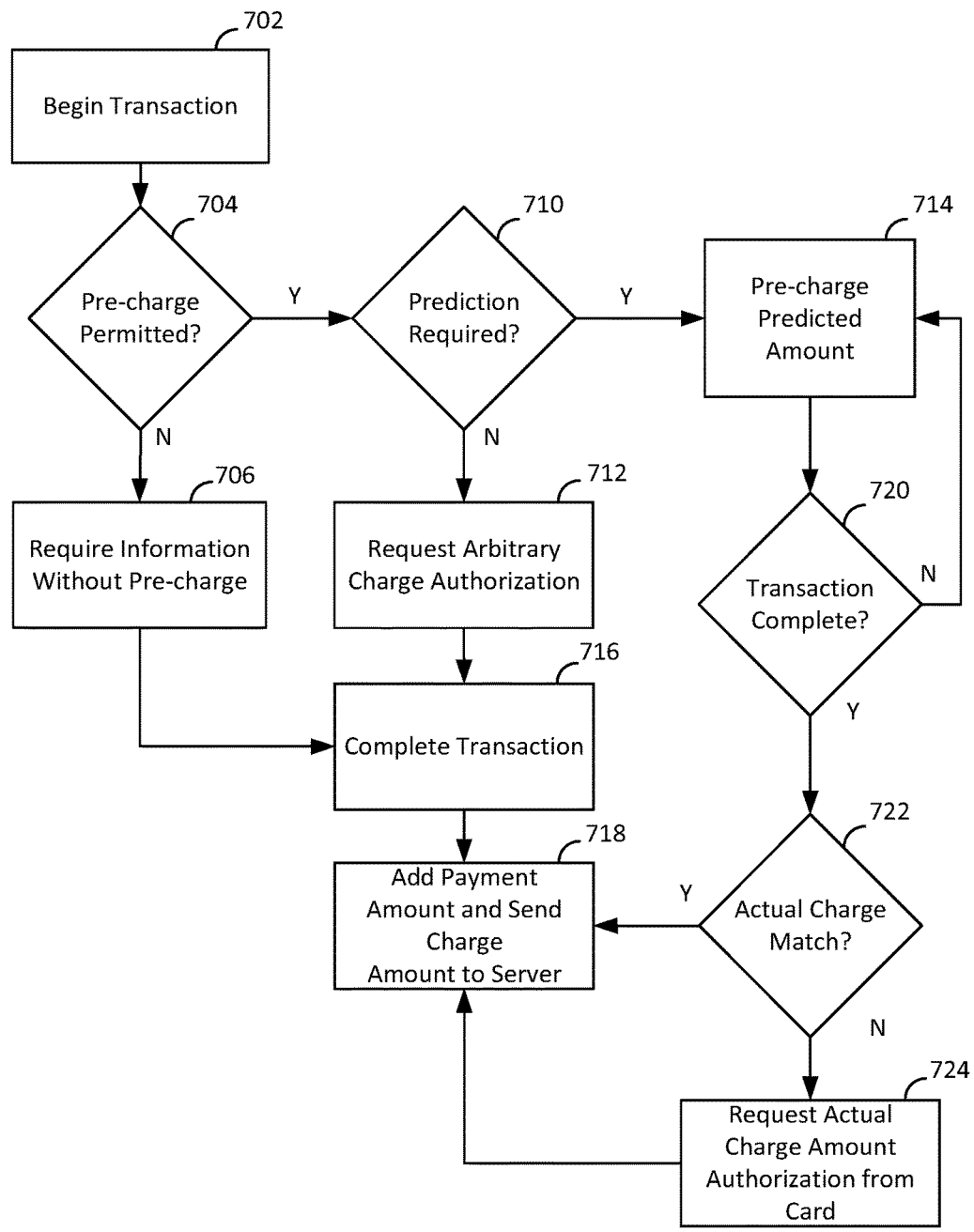
FIG. 7 depicts a non-limiting flow diagram illustrating exemplary methods for completing a payment transaction at a payment reader in accordance with some embodiments of the present disclosure.
Figure 8:
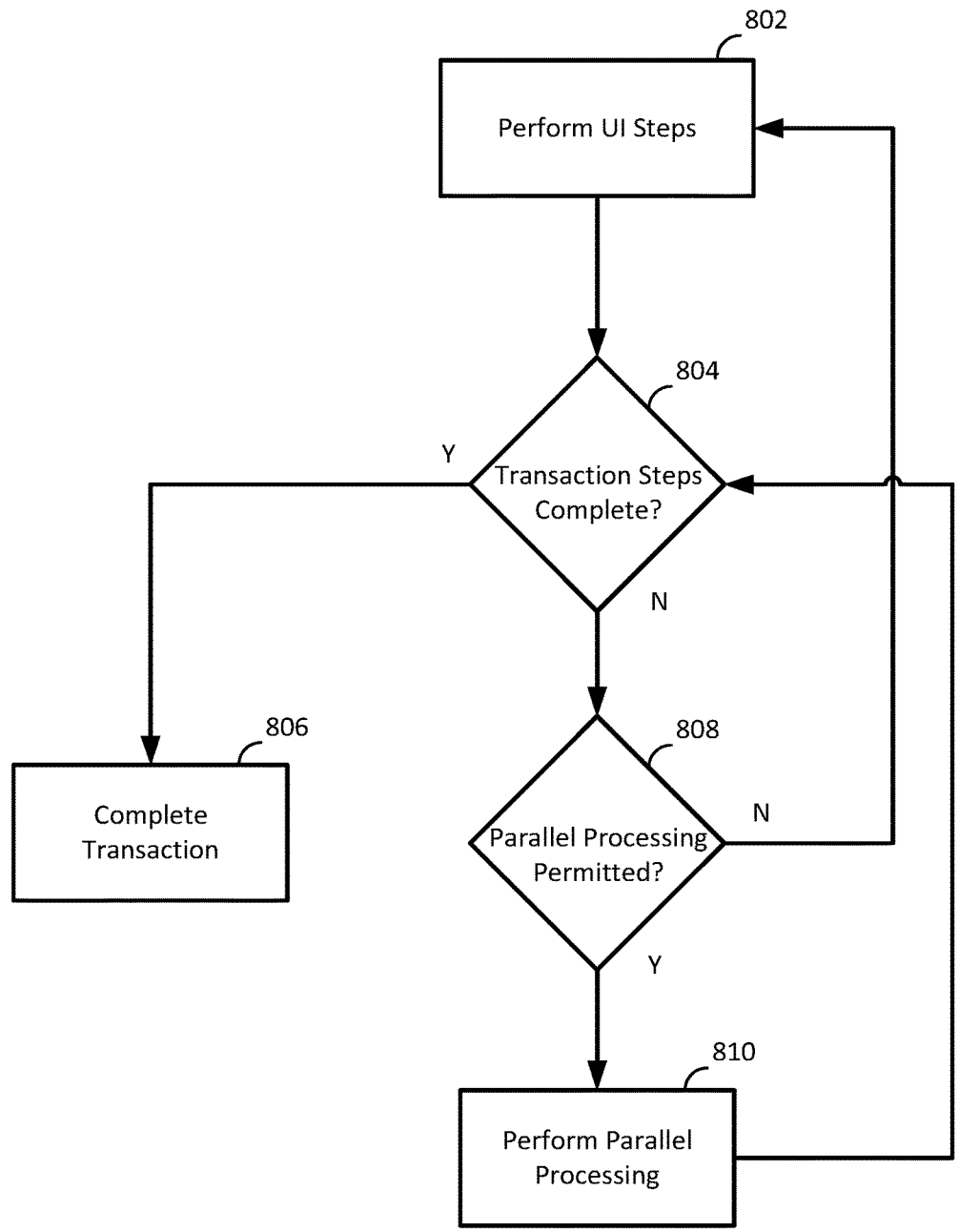
FIG. 8 depicts a non-limiting flow diagram illustrating exemplary methods for processing payments at a payment terminal in accordance with some embodiments of the present disclosure.

In view of the structures and devices described supra, methods that can be implemented in accordance with the disclosed subject matter will be better appreciated with reference to the flowcharts of FIGS. 6-8. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts exemplary methods for enabling transaction processing circuitry at a payment reader in accordance with some embodiments of the present disclosure. In one embodiment, as is depicted in FIG. 6, methods for enabling transaction processing circuitry are performed by a payment terminal 20 device (e.g., the combination of payment reader 22 and merchant device 29). Although these steps are described as being performed by particular devices in one embodiment, it will be understood that the allocation of the steps between the devices may be modified in any suitable manner or that the number of devices performing the steps may be modified in any suitable manner.

At step 602, transaction chip 114 of payment reader 22 may operate in a low-power mode, during which the transaction chip 114 may perform limited or no operations. As described herein with reference to FIG. 3, transaction chip 114 may consume substantially less power while operating in the low-power mode, and may remain in the low-power mode between transactions. Processing may then continue to step 604.

At step 604, payment reader 22 may determine whether an input has been received at the payment reader 22 indicating that the transaction chip should wake up (e.g., based on a chip card being detected at chip card detection circuit 112, a NFC device 12 being detected at NFC device detection circuit 116, a message received from a merchant device, or other available inputs such detection of the presence of a customer). In some embodiments, the wake-up message may be provided from a chip-card detection circuit coupled to the transaction chip 114 and contact interface 104 of payment reader 22. The wake-up message may be based on various information, such as a determination that a customer is likely to engage in a payment transaction, dwell time, payment terminal location, queue length, progress of a payment transaction occurring at the merchant device 29, a user of merchant device 29, a type of payment transaction, or other information. In some embodiments, if payment reader 22 determines that a wake-up message has been received at payment reader 22, processing may continue to step 608. If no wake-up message has been received at payment reader 22, processing may continue to step 610.

At step 608, payment reader 22 may determine whether preliminary enablement (e.g., "wake up") of transaction chip 114 by entering transaction processing mode is required based on information available at payment reader 22. In some embodiments, the determination may be based on various information, including information provided in a wake-up message, a type of payment device detected at payment reader 22, a level of power of power supply 106 (e.g., battery level) coupled to transaction chip 114, time since a previous payment transaction, or other information. If payment reader 22 determines that the wake up of transaction chip 114 is required based on information at payment reader 22, processing may continue to step 612. If payment reader 22 is unable to determine that the wake up of transaction chip 114 is required, processing may continue to step 610.

At step 612, payment reader 22 may wake up the transaction chip 114. In an exemplary embodiment, wake up of transaction chip 114 may comprise transitioning transaction chip 114 from low-power mode to transaction processing mode. In some embodiments, transaction chip 114 may perform payment processing operations in the transaction processing mode and provide full power to all of the available payment interfaces. Transaction chip 114 may remain in transaction processing mode for a suitable duration of time, such as until a request for payment information is received. In some embodiments, if no request for payment information is received within a threshold wake-up period (e.g., approximately 10-60 seconds, based on factors such as transaction frequency, battery level, measured power consumption, and threshold time periods), transaction chip 114 may return to the low-power mode.

Beginning at step 610, processing to determine whether to wake up the transaction chip may be performed by merchant device 29. In an embodiment, merchant device 29 may examine various criteria based on information from payment terminals 20 in communication with payment service system 50 (e.g., "global criteria") to determine whether the wake up of transaction chip 114 may be required. In some embodiments, the global criteria may be stored in memory 204 of merchant device 29 as reader management instructions 224, and may include information such as information based on payment transactions other terminals of the same merchant, type of merchant, geographical location, transaction timeframes, or other information. In some embodiments, global criteria may include information based on merchant type, similar merchants, similar merchant locations, an average battery life of payment readers 22, average number of transactions per charge, an average length of time the transaction chip 114 of payment readers 22 remained in transaction processing mode without receiving a request for payment information, number of times a threshold level of progress for providing a wake-up message to a payment reader 22 increased or decreased based on a power level of a battery, or other information. After merchant device 29 examines global criteria from payment terminal 20, processing may continue to step 614.

At step 614, merchant device 29 may examine various criteria based on information from the payment reader 22 (e.g., "local criteria"). In some embodiments, the global criteria may be stored in memory 204 of merchant device 29 as reader management instructions 224 and may be based on information such as merchant information, location, information about its components, employees, queues, battery life, software or other information. In some embodiments, the criteria may further comprise information such as average battery life of payment reader 22, transaction execution times, time of day for transactions, most frequently used payment methods at the payment terminal 20, average time between charges of the power supply 106 of payment reader 22, average number of wake-up messages sent and received, a length of time when the transaction chip 114 remained in transaction processing mode while waiting for a request for payment information, information about a customer (e.g., customer identity) or cashier (e.g., employee identity or responsibility), or other information. In some embodiments, the criteria may comprise information based on cart activity (e.g., using a customer's cart activity as a heuristic for waking up transaction chip 114). In some embodiments, the criteria may include information based on addition of one or more items to a customer's cart or restoration of an open ticket. After merchant device 29 examines local criteria from payment terminal 20, processing may continue to step 616.

At step 616, merchant device 29 may determine whether the wake up of transaction chip 114 is required based on examination of global criteria at step 610 and local criteria at step 614. Although limited examples of determinations by merchant device 29 will be described for efficiency, merchant device may examine any suitable global criteria at step 610 and local criteria at step 614 when determining whether preliminary wake up of transaction chip 114 is required. For example, merchant device 29 may determine that wake up of transaction chip 114 is required based on a battery level of the payment reader 22 and a determination that an amount of time that transaction chip 114 of payment reader 22 has remained in transaction processing mode does not exceed a pre-defined threshold established based on global criteria. In other embodiments, the determination may be made based on other criteria such as transaction frequency and the presence of customers in a queue. If merchant device 29 determines that the wake up of transaction chip 114 is not required, processing may return to step 602. If merchant device 29 determines that preliminary wake up of transaction chip 114 is required, processing may continue to step 618.

At step 618, merchant device 29 may provide a wake up message to payment reader 22. The message may include any suitable information for signaling to payment reader 22 that transaction chip 114 should be transitioned from low-power mode to transaction processing mode to process an imminent payment transaction. After merchant device 29 provides the wake up message to payment reader 22, processing may continue to step 612, at which the transaction chip may exit the low-power mode and enter a transaction processing mode. Thereafter, the processing may end.

FIG. 7 depicts a non-limiting flow diagram illustrating exemplary methods for completing a payment transaction utilizing pre-charge at a payment terminal 20 in accordance with some embodiments of the present disclosure. Although it will be understood that any suitable device may complete the payment transaction, in an exemplary embodiment the transaction may be completed at a merchant device 29 and payment reader 22 of payment terminal 20.

At step 702, a payment transaction may begin at merchant device 29. In some embodiments, the payment transaction may begin when a user provides a user input at merchant device 29 (e.g., via user interface 210), which may be transmitted to payment reader 22. In some embodiments, the transaction may begin when a chip card interacts with a chip card interface of payment reader 22 (e.g., contact interface 104) configured to exchange payment messages with the chip card. In some embodiments, contact interface 104 may provide a notification that a chip card inserted into contact interface 104. After the payment transaction begins, processing may continue to step 704.

At step 704, merchant device 29 may determine whether a payment pre-charge request is permitted. In some embodiments, the determination may be based on information about the chip card. The information may be provided by the chip card, such as via contact interface 104 of payment reader 22. In some embodiments, the information may be provided to merchant device 29 via a communication interface of payment reader 22 (e.g., wireless interface 108 or wired interface 110). In some embodiments, the determination that a pre-charge request is permitted may be based on information about the chip card, such as an issuer of the chip card, identity of a customer, identity of a cashier, merchant type, merchant location, or other information. If merchant device 29 determines that a payment pre-charge request is not permitted processing may continue to step 706. If payment pre-charge is permitted, processing may continue to step 710.

At step 706, merchant device 29 may require payment information from the chip card without providing a payment pre-charge request to the chip card. In some embodiments, merchant device 29 may wait to request an authorization information response from the chip card until an actual payment amount for the payment transaction has been determined (e.g., a final payment amount) and provided to merchant device 29. Various information for completing the payment transaction may be requested by merchant device 29 and provided by a chip card in some embodiments. After the chip card has provided the required authorization information response for completing the payment transaction, processing may continue to step 716.

At step 710, merchant device 29 may determine whether the chip card requires prediction of a preliminary payment amount to include with a request for authorization information response. In some embodiments, the determination may be based on the chip card, including information such as customer identity, card issuer, or other information. In some embodiments, a chip card may permit the preliminary payment amount in a pre-charge request to be an arbitrary amount, such as when a chip card does not require authorization of an actual transaction amount before providing a payment authorization. In some embodiments, the preliminary payment amount must match an actual payment amount in order for the chip card to provide the authorization information response. If merchant device 29 determines that prediction of a preliminary payment mount is not required, processing may continue to step 712. If merchant device 29 determines that prediction of a preliminary payment amount is required, processing may continue to step 714.

At step 712, merchant device 29 may include an arbitrary preliminary payment amount in a pre-charge request sent to the chip card. In some embodiments, the preliminary payment amount associated with the pre-charge request may be any arbitrary amount, or may be selected based on any suitable information. In response, a chip card may provide an authorization information response authorizing payment for the transaction. In some embodiments, the authorization information response may include an authorization response cryptogram or other information. After the pre-charge request including an arbitrary preliminary payment amount has been provided to the chip card, processing may continue to step 716 to complete the transaction.

At step 716, merchant device 29 may complete the payment transaction. In some embodiments, merchant device 29 may process the payment transaction as it according to the steps for normal processing of electronic payment information provided by an EMV chip card. Merchant device 29 may complete the transaction by determining an actual payment amount based on a subsequent user input at the user interface 210. In some embodiments, merchant device 29 may request an authorization information response after an actual payment amount for the payment transaction has been determined. Other procedures for processing a chip card payment transaction without a pre-charge request are possible in other embodiments. In some embodiments, merchant device 29 may store an authorization information response from a chip card in memory, such as memory 204. In some embodiments, a transaction complete indicator may be provided once merchant device 29 completes the transaction. In some embodiments, indicator may be provided to a user interface 210 for display to a user. After merchant device 29 completes EMV chip card transaction, processing may continue to step 718.

At step 714, merchant device 29 may send a pre-charge request that includes a preliminary payment amount selected based on a prediction of what the actual payment amount will be for the payment transaction. In some embodiments, the predicted amount may be determined using any suitable techniques for predicting one or more preliminary payment amounts most likely to match the actual payment amount. In some embodiments, techniques may include speculating what the actual payment amount will be. In some embodiments, iterative techniques may be used to predict the actual payment amount, applying techniques such as machine learning. In some embodiments, the predicted amount may be determined using any suitable information for approximating what the actual payment amount will be, such as time of day of the payment transaction, a merchant location, information about an item purchased, information about selected items and other items that are typically purchased together, identity of a customer, identity of a cashier or clerk, location of the payment terminal 20, or other information. After merchant device 29 predicts a preliminary payment amount, it may provide an associated pre-charge request to the chip card. Note that, in some embodiments, merchant device 29 may provide additional pre-charge requests associated with additional preliminary payment amounts to receive additional authorization information responses in response to the additional pre-charge requests, for example, until the transaction is complete. After merchant device 29 provides a pre-charge request and associated predicted preliminary payment amount to the chip card, processing may continue to step 720.

At step 720, merchant device 29 may determine whether the transaction has been completed, such as by identifying whether a transaction complete indicator has been received at the merchant device 29, or whether a user has provided a subsequent input and a final payment amount for the payment transaction has been determined. In some embodiments, merchant device 29 may determine whether the payment transaction has been completed based on input from a user at the user interface 210 (e.g., via point-of-sale application 222), or based on receipt of a transaction complete indicator. If merchant device 29 determines the transaction has not been completed, processing may return to step 714, and merchant device 29 may provide an additional pre-charge request to the chip card interface (e.g., contact interface 104) of payment reader 22 containing a unique preliminary payment amount. In response, merchant device 29 may receive an additional authorization information response and store the additional response in memory. Note that in some embodiments, merchant device 29 may repeat the steps at 714 for a plurality of additional pre-charge requests and receive and store a plurality of additional authorization information responses, and may continue to provide pre-charge requests until the transaction is completed (e.g., a transaction complete indicator is received). If merchant device 29 determines that the transaction has been completed, processing may continue to step 722.

At step 722, merchant device 29 may compare an actual payment amount with preliminary payment amounts predicted at step 714 and provided to the chip card interface with a pre-charge request. If one of the preliminary payment amounts matches the actual payment amount, processing may continue to step 718. If no match is found, processing may continue to step 724, and merchant device 29 may provide a request for an authorization information response for the actual payment amount to the chip card interface. Once the authorization information response for the actual payment amount has been received at step 724, processing may continue to step 718.

At step 718, merchant device 29 may add an amount to the preliminary payment amount for which a chip card has provided authorization information response to match an actual payment amount for the transaction and send the charge to one or more transaction processing servers for processing. In some embodiments, a final payment amount for a payment transaction may be determined, for example, based on subsequent input provided by a user, and may include an amount reflecting addition of taxes or other fees.

The merchant device 29 may generate a payment authorization message, which may include the final payment amount, and send the payment authorization message to one or more transaction processing servers for approval. In some embodiments, merchant device 29 may provide the authorization information response associated with a preliminary payment amount matching the actual payment amount to the one or more transaction processing servers. In some embodiments, merchant device 29 may receive a response to the payment authorization message from the one or more transaction processing servers indicating whether the payment transaction has been approved. After the response to the payment authorization message is received processing may end.

FIG. 8 depicts a non-limiting flow diagram illustrating exemplary steps for processing payments at a payment terminal 20 in accordance with some embodiments of the present disclosure. Although it will be understood that any suitable device may complete the payment transaction, in an exemplary embodiment the transaction may be completed at a merchant device 29 and payment reader 22 of payment terminal 20.

At step 802, merchant device 29 may perform payment transaction processing steps, such as steps provided to user interface 210 (e.g., steps in point-of-sale application instructions 222). Exemplary steps provided to the user interface 210 may be displayed to a user, and may include requesting or providing information related to the point-of-sale application instructions 222, an icon for selection to begin processing of a payment transaction, items for selection by a user, a register terminal with a virtual number pad for entering a payment amount, consumer verification method information (e.g., a signature line or number pad for entering a personal identification number or PIN), a notification that payment has been processed, and a notification of whether the transaction has been approved. After performance of steps at user interface 210 has begun, processing may continue to step 804.

At step 804, merchant device 29 may determine whether steps of a payment transaction at user interface 210 have been completed. In some embodiments, the determination may be based on input from a user, a notification, a transaction complete indicator, or other suitable information. If all steps of the payment transaction have been completed, processing may continue to step 806, where the transaction may be completed by determining a final payment amount and transmitting an authorization information response to one or more transaction servers as a payment authorization message. Once the payment transaction has been completed, processing may end. If all steps of the payment transaction have not been completed, processing may continue to step 808.

At step 808, merchant device 29 may determine whether parallel processing of transaction steps (e.g., steps at user interface 210 begun at step 802) is permitted. In some embodiments, it may be possible to perform one or more payment transaction steps in parallel with other payment transaction steps. Merchant device 29 may determine whether steps remaining in a payment transaction comprises any steps that may be performed in parallel and, if so, may determine that parallel processing is permitted. If merchant device 29 determines that parallel processing is permitted, processing may continue to step 810. If merchant device 29 determines that parallel processing is not permitted, processing may return to step 802.

At step 810, merchant device 29 may perform parallel processing of payment transaction steps. For example, in some embodiments, processing of consumer verification method information and selection of items for purchase, or request for an authorization information response from a chip card may be performed in parallel. In some embodiments, merchant device 29 may perform parallel processing of payment transaction steps for as many payment transaction steps as possible in order to complete the payment transaction more quickly. After merchant device 29 has completed parallel processing of payment transaction steps for which parallel processing is permitted, processing may return to step 804.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A payment terminal for receiving a request for payment and exchanging electronic payment information with a chip card, the payment terminal comprising:
   a chip card interface configured to receive the chip card and exchange the electronic payment information with the chip card;
   a communication interface configured to communicate with one or more transaction processing servers;
   a user interface configured to display a point-of-sale application to a user and receive user inputs based on the point-of-sale application;
   one or more processing units coupled to the chip card interface, the communication interface, and the user interface, wherein the one or more processing units are configured to execute user interface instructions, transaction pre-charge instructions, and transaction processing instructions; and
   one or more memories configured to store the user interface instructions, the transaction pre-charge instructions, and the transaction processing instructions,
   wherein the user interface instructions, when executed by the one or more processing units, cause the one or more processing units to display the point-of-sale application at the user interface, to initiate a transaction, to receive at a chip card interface electronic payment information associated with a chip card, to generate a pre-charge request in response to a first user input at the point-of-sale application wherein the pre-charge request is associated with a predicted payment amount for the transaction, and to receive a transaction complete indicator in response to a subsequent user input at the point-of-sale application,
   wherein the pre-charge instructions, when executed by the one or more processing units, cause the one or more processing units to send the pre-charge request to the chip card interface, to acquire an authorization response cryptogram associated with the chip card from the chip card interface in response to the pre-charge request, and to store the authorization response cryptogram in association with the predicted payment amount, and
   wherein the transaction processing instructions, when executed by the one or more processing units, cause the one or more processing units (1) to determine an actual payment amount of the transaction, (2) to compare the actual payment amount to a plurality of predicted payment amounts, each predicted payment amount being stored in association with a respective stored authorization response cryptogram associated with the chip card, the comparing being done for each of the plurality of predicted payment amounts until a stored predicted payment amount, of the plurality of predicted payment amounts, that matches the actual payment amount is found, (3) to identify an authorization response cryptogram stored in association with the stored predicted payment amount, and (4) to transmit the identified authorization response cryptogram to the one or more transaction processing servers via the communication interface.

2. The payment terminal of claim 1, wherein the pre-charge request includes a preliminary payment amount.

3. The payment terminal of claim 2, wherein the pre-charge instructions, when executed by the one or more processing units, further cause the one or more processing units to send a plurality of additional pre-charge requests to the chip card interface,
   wherein each pre-charge request includes a unique preliminary payment amount,
   wherein the pre-charge instructions, when executed by the one or more processing units, further cause the one or more processing units to receive additional authorization response cryptograms in response to the additional pre-charge requests and store the additional authorization response cryptograms, and
   wherein the transaction processing instructions, when executed by the one or more processing units, cause the one or more processing units to determine an actual payment amount based on the subsequent user input, to compare the preliminary payment amounts associated with the stored authorization response cryptograms to the actual payment amount, and when one of the preliminary payment amounts matches the actual payment amount, to transmit an authorization response cryptogram associated with the matching preliminary payment amount to the one or more transaction processing servers via the communication interface in response to receiving the transaction complete indicator.

4. The payment terminal of claim 3, wherein each of the preliminary payment amounts is based on a predicted payment amount for the transaction.

5. A system for processing a chip card transaction, the system comprising:
   a chip card interface configured to exchange payment messages with a chip card;
   a communication interface configured to communicate with one or more transaction processing servers;
   a user interface configured to display a point-of-sale application to a user and receive user inputs based on the point-of-sale application;

one or more processing units coupled to the chip card interface, the communication interface, and the user interface, wherein the one or more processing units are configured to execute user interface instructions, transaction pre-charge instructions, and transaction processing instructions; and one or more memories configured to store the user interface instructions, the transaction pre-charge instructions, and the transaction processing instructions, wherein the user interface instructions, when executed by the one or more processing units, cause the one or more processing units to display the point-of-sale application to the user interface, to initiate a transaction, to receive at a chip card interface, electronic payment information associated with a chip card, to generate a pre-charge request in response to a first user input at the point-of sale application wherein the pre-charge request is associated with a predicted payment amount for the transaction, and to receive a transaction complete indicator in response to a subsequent user input at the point-of-sale application, wherein the pre-charge instructions, when executed by the one or more processing units, cause the one or more processing units to send the pre-charge request to the chip card interface, to acquire an authorization information response associated with the chip card from the chip card interface, and to store the authorization information response in association with the predicted payment amount, and wherein the transaction processing instructions, when executed by the one or more processing units, cause the processing unit (1) to determine an actual payment amount of the transaction, (2) to compare the actual payment amount to a plurality of predicted payment amounts, each predicted payment amount being stored in association with a respective stored authorization information response, the comparing being done for each of the plurality of predicted payment amounts until a stored predicted payment amount, of the plurality of predicted payment amounts, that matches the actual payment amount is found, (3) to identify an authorization information response stored in association with the stored predicted payment amount, and (4) to transmit the identified authorization information response to the one or more transaction processing servers via the communication interface.

6. The system of claim 5, wherein the pre-charge request includes a preliminary payment amount.

7. The system of claim 6, wherein the pre-charge instructions, when executed by the one or more processing units, further cause the one or more processing units to send a plurality of additional pre-charge requests to the chip card interface, wherein each pre-charge request includes a unique preliminary payment amount, wherein the pre-charge instructions, when executed by the one or more processing units, further cause the one or more processing units to receive additional authorization information responses in response to the additional pre-charge requests and store the additional authorization information responses, and wherein the transaction processing instructions, when executed by the one or more processing units, cause the one or more processing units to determine an actual payment amount based on the subsequent user input, to compare the preliminary payment amounts associated with the stored authorization information responses to the actual payment amount, and when one of the preliminary payment amounts matches the actual payment amount, to transmit an authorization information response associated with the matching preliminary payment amount to the one or more transaction processing servers via the communication interface in response to receiving the transaction complete indicator.

8. The system of claim 7, wherein each of the preliminary payment amounts is based on a predicted payment amount for the transaction.

9. The system of claim 8, wherein each of the predicted payment amounts is based on a history of past payment transactions.

10. The system of claim 7, wherein the plurality of additional pre-charge requests is sent to the chip card interface until the transaction complete indicator is received.

11. The system of claim 5, wherein the authorization information response comprises an authorization response cryptogram.

12. The system of claim 5, wherein the transaction processing instructions, when executed by the one or more processing units, further cause the processing unit to determine a final payment amount based on the subsequent user input, to generate a payment authorization message based on the stored authorization information and the final payment amount, and to transmit the payment authorization message to the one or more transaction processing servers via the communication interface.

13. A chip card transaction processing method, comprising:

displaying, at a user interface of a payment terminal, point-of-sale application to a user;

initiating a transaction;

receiving, at the user interface, a user input based on the point-of-sale application, the user input relating to the transaction;

generating a pre-charge request in response to the user input at the point-of-sale application, wherein the pre-charge request is associated with a predicted payment amount for the transaction;

sending the pre-charge request to a chip card interface;

acquiring an authorization information response associated with the chip card from the chip card interface;

storing the authorization information response from the chip card interface in association with the predicted payment amount;

receiving, at the user interface, a transaction complete indicator in response to a subsequent user input at the point-of-sale application;

determining an actual payment amount of the transaction, in response to receipt of the transaction completed indicator;

comparing the actual payment amount to a plurality of predicted payment amounts, each predicted payment amount being stored in association with a respective stored authorization information response associated with the chip card, the comparing being done for each of the plurality of predicted payment amounts until a stored predicted payment amount, of the plurality of predicted payment amounts, that matches the actual payment amount is found;

identifying an authorization information response stored in association with the stored predicted payment amount; and transmitting, via a communication interface of the payment terminal, the identified authorization information response to one or more transaction processing servers.

14. The method of claim 13, wherein the pre-charge request includes a preliminary payment amount.

15. The method of claim 14, further comprising:
sending a plurality of additional pre-charge requests to the chip card interface, wherein each pre-charge request includes a unique preliminary payment amount;
receiving additional authorization information responses in response to the plurality of additional pre-charge requests;
storing the additional authorization information responses;
determining an actual payment amount based on the subsequent user input;
comparing the preliminary payment amounts associated with the stored authorization information responses to the actual payment amount; and
transmitting, when one of the preliminary payment amounts matches the actual payment amount, the authorization information response associated with the matching preliminary payment amount to the one or more transaction processing servers via the communication interface in response to the transaction complete indicator.

16. The method of claim 15, wherein each of the preliminary payment amounts is based on a predicted payment amount for the transaction.

17. The method of claim 16, wherein each of the predicted payment amounts is based on a history of past payment transactions.

18. The method of claim 15, wherein sending the plurality of additional pre-charge requests to the chip card interface comprises sending the plurality of additional pre-charge requests to the chip card interface until the transaction complete indicator is received.

19. The method of claim 13, wherein the authorization information response comprises an authorization response cryptogram.

20. The method of claim 13, further comprising:
determining a final payment amount based on the subsequent user input;
generating a payment authorization message based on the stored authorization information and the final payment amount; and
transmitting the payment authorization message to the one or more transaction processing servers via the communication interface.

21. A non-transitory computer-readable storage medium comprising instructions stored therein, which when executed by one or more processors, cause the one or more processors to perform operations comprising:
displaying, to a user at a user interface, a point-of-sale application;
initiating a transaction;
receiving a user input from the user interface based on the point-of-sale application, the user input relating to the transaction;
generating a pre-charge request in response to the user input at the point-of-sale application, wherein the pre-charge request is associated with a predicted payment amount for the transaction;
providing the pre-charge request to a chip card interface;
acquiring an authorization information response associated with the chip card from the chip card interface;
storing the authorization information response from the chip card interface in association with the predicted payment amount;
receiving a transaction complete indicator from the user interface in response to a subsequent user input at the point-of-sale application;
determining an actual payment amount of the transaction;
comparing the actual payment amount to a plurality of predicted payment amounts, each predicted payment amount being stored in association with a respective stored authorization information response, the comparing being done for each of the plurality of predicted payment amounts until a stored predicted payment amount, of the plurality of predicted payment amounts, that matches the actual payment amount is found;
identifying an authorization information response stored in association with the stored predicted payment amount; and
providing the identified authorization information response for transmission via a communication interface to one or more transaction processing servers.

22. The non-transitory computer-readable storage medium of claim 21, wherein the pre-charge request includes a preliminary payment amount.

23. The non-transitory computer-readable storage medium of claim 22, wherein the instructions further comprise instructions that, when executed by the one or more processing units, cause the one or more processors to:
provide a plurality of additional pre-charge requests to the chip card interface, wherein each pre-charge request includes a unique preliminary payment amount;
receive additional authorization information responses in response to the plurality of additional pre-charge requests;
provide the additional authorization information responses for storage in memory;
determine an actual payment amount based on the subsequent user input;
compare the preliminary payment amounts associated with the stored authorization information responses to the actual payment amount; and
provide, to the communication interface when one of the preliminary payment amounts matches the actual payment amount, the authorization information response associated with the matching preliminary payment amount for transmission to the one or more transaction processing servers in response to the transaction complete indicator.

24. The non-transitory computer-readable storage medium of claim 23, wherein each of the preliminary payment amounts is based on a predicted payment amount for the transaction.

25. The non-transitory computer-readable storage medium of claim 24, wherein each of the predicted payment amounts is based on a history of past payment transactions.

26. The non-transitory computer-readable storage medium of claim 23, wherein the instructions that cause the one or more processors to provide the plurality of additional pre-charge requests to the chip card interface comprise instructions that cause the one or more processors to provide the plurality of additional pre-charge requests to the chip card interface until the transaction complete indicator is received.

27. The non-transitory computer-readable storage medium of claim 21, wherein the authorization information response comprises an authorization response cryptogram.

28. The non-transitory computer-readable storage medium of claim 21, wherein the instructions further comprise instructions that cause the one or more processors to:

determine a final payment amount based on the subsequent user input;
generate a payment authorization message based on the stored authorization information and the final payment amount; and
provide, to the communication interface, the payment authorization message for transmission to the one or more transaction processing servers.

29. The method of claim 13, further comprising:
generating a plurality of additional pre-charge requests, wherein each pre-charge request corresponds to a predicted payment amount of the plurality of predicted payment amounts;
storing, in association with each of the plurality of additional pre-charge requests, a respective priority value;
sending the plurality of additional pre-charge requests to the chip card interface in order of their associated priority value;
receiving authorization information responses in response to the plurality of additional pre-charge requests; and
storing the received authorization information responses.

\* \* \* \* \*